(12) United States Patent
Masson et al.

(10) Patent No.: US 12,287,802 B2
(45) Date of Patent: Apr. 29, 2025

(54) APPARATUS AND METHOD FOR FILTERING DATA FROM OR ACROSS DIFFERENT ANALYTICS PLATFORMS

(71) Applicant: DIGITAL HIVE, INC., Plano, TX (US)

(72) Inventors: Scott Masson, Ottawa (CA); Jerry Lynn Moore, Jr., Lucas, TX (US)

(73) Assignee: DIGITAL HIVE, INC., Plano, TX (US)

( * ) Notice: Subject to any disclaimer, the term of this patent is extended or adjusted under 35 U.S.C. 154(b) by 0 days.

(21) Appl. No.: 17/843,050

(22) Filed: Jun. 17, 2022

(65) Prior Publication Data

US 2022/0405297 A1    Dec. 22, 2022

Related U.S. Application Data

(60) Provisional application No. 63/212,164, filed on Jun. 18, 2021.

(51) Int. Cl.
*G06F 16/25* (2019.01)
*G06F 16/2458* (2019.01)

(52) U.S. Cl.
CPC ........ *G06F 16/254* (2019.01); *G06F 16/2471* (2019.01)

(58) Field of Classification Search
CPC ............................ G06F 16/254; G06F 16/2471
USPC ............................................................ 707/602
See application file for complete search history.

(56) References Cited

U.S. PATENT DOCUMENTS

| | | | | |
|---|---|---|---|---|
| 10,997,195 | B1* | 5/2021 | Sekar | G06N 20/00 |
| 2002/0184247 | A1* | 12/2002 | Jokela | G06F 16/2471 |
| 2017/0103103 | A1* | 4/2017 | Nixon | G06F 16/2452 |
| 2023/0237063 | A1* | 7/2023 | Cejudo | G06F 7/14 |
| | | | | 707/602 |

* cited by examiner

*Primary Examiner* — Robert W Beausoliel, Jr.
*Assistant Examiner* — Lauren Zannah Ganger
(74) *Attorney, Agent, or Firm* — Pauley Erickson & Swanson

(57) ABSTRACT

A system and method for combining data from disparate business intelligence systems and data sources. The method includes aggregating data in real-time across multiple, disparate data platforms of more than one third party, by mapping nonmatching data parameters used in the different platforms to a common data field. The business intelligence systems are queried to identify responsive data fields, which are then meshed in a translation and/or unification module into the common data field for display. The meshing of the data allows for efficient filtering according to user inputs. The system and method further include applications to allow users to create parameter mappings for the data meshing.

8 Claims, 33 Drawing Sheets

Parameter Mapping

Target
- 123 year
- ⊙ location
- abc sales_rep

Total Earnings
- 123 year
- ⊙ location
- abc sales_rep

Trailing 4 Quarters
- 123 Period
- ⊙ region
- abc product_line

Profit by Quarter
- 123 period
- ⊙ region
- abc product_line

World wide
- ⊙ country
- abc 123 currency

Period
- target_5year
- total_earnings_5year
- trailing_4_quarters_5period
- profit_by_quarter_5period

Territory
- target_5location
- total_earnings_5location
- trailing_4_quarters_5region

[Cancel] [Apply]

APPARATUS AND METHOD FOR FILTERING DATA FROM OR ACROSS DIFFERENT ANALYTICS PLATFORMS

FIELD OF THE INVENTION

This invention relates generally to an apparatus, such as a computer and/or software system, and method for combining data from across disparate business intelligence and analytics systems, and, more particularly, to an apparatus and method for filtering and improved querying of the data from the different systems.

BACKGROUND OF THE INVENTION

An analytics catalog is a new and growing trend that consolidates enterprise reporting and analytics assets into a single reporting metadata data catalog. It provides end users with a single self-service data interface that can access all reporting and dashboards irrespective of the underlying business intelligence data source technology. This technology enables end users to share, find, search, comment, and rate dashboards, reports, and/or datasets from a diverse range of third party data platforms in one place. Each analytics platform provides its own mechanisms in which to filter data within its visualizations, using parameters that need to be supplied to render or re-render the visualization. This makes it difficult to pull and combine data from among and between the different systems. There is a continuing need to provide improved data consolidation across multiple, different third party data platforms.

SUMMARY OF THE INVENTION

The present invention is directed to an analytics catalog system that brings together data visualizations from disparate third party data sources, for example, business intelligence (BI) systems, into a composite dashboard that allows end users to view content from these disparate systems, such as, without limitation, IBM Cognos, Microsoft PowerBI, and Tableau, in a single user interface. Each of these analytics platforms provides its own mechanisms in which to filter data within its visualizations, using parameters that need to be supplied to render or re-render the visualization. The composite system of this invention coordinates or links the individual, disparate parameters based upon a central filtering instruction from the dashboard user.

The invention includes and/or provides a unified filtering mechanism, applicable across disparate data sources, such as business intelligence and analytics (BI&A) platforms. The unification filtering of this invention provides a common/central filtering control that allows users to modify parameter values in a consistent manner, and then re-render the visualizations from all data systems using the central filter control. This would reduce the end user need to filter multiple times in each data system visualization, and removes the scenario where the user forgets to update one visualization resulting in inconsistencies in the analysis.

As used herein, "business intelligence," or "BI," refers to reporting technology that generates visualizations (charts, lists, etc.) from operational data. The method and system of this invention benefits end users that are required to work with multiple BI&A solutions in order to effectively analyze corporate data. Users will be able to simultaneously analyze data across disparate systems; replacing the current way that this type of analysis is performed, which consists of repetitive, error prone, manual interactions.

The invention includes a method for combining data with a data processor system, from disparate (e.g., multiple BI) data sources. The method includes aggregating data in real-time across multiple, disparate data platforms of more than one third party, by mapping nonmatching data parameters to a common data field. The method can further include steps of querying the multiple, disparate data platforms to identify responsive data fields or parameters, and meshing the data from the responsive data fields into the common data field for display.

The invention includes a system for combining data from disparate data sources. The system includes a data processor in combination with a non-transitory recordable medium including a set of encoded software instructions to aggregate data in real-time across multiple, disparate data platforms of more than one third party, and filter the aggregated data according to user inputs. In embodiments of this invention, the encoded instructions further establish a unification layer to mesh the data of disparate parameters into a common data field. The system can then filter the aggregated data through filter constraints applied to or through the unification layer.

The invention further includes a method for combining data with a data processor system, from disparate data sources. The method includes steps of aggregating data in real-time across multiple, disparate data platforms of more than one third party, and filtering the aggregated data according to user inputs. In embodiments of this invention, the aggregating step includes querying the multiple, disparate data platforms of the third parties to identify responsive data fields, and meshing the data from the responsive data fields for display. The meshing can include steps of matching different data parameters across the disparate data platforms of more than one third party. The filtering step can include modifying a filter value and showing meshed data matching the filter value. As used herein, "filter" or "filtering" refers to a selectable value that is used to modify the data that is displayed in a report. Selecting a central 'filter' value causes automated re-rendering of the displayed data from each of the BI sources, according to the selected filter(s).

In some embodiments, the method includes aggregating the disparate data in a display, and unifying displayed data using one or more common data fields. When a filter request is received from a user, the data on the display is updated using the common data fields.

In embodiments of this invention, the filtering of the aggregated data is according to user inputs. The method can includes steps of receiving a user input for an adjustment to the aggregated data and displaying the adjusted data to the user. Exemplary user inputs include a time input, a location input, an entity input, or combinations thereof.

In embodiments of this invention, an application programming interface (API) connector is provided for each of the disparate data platforms. The connector converts retrieved data to a corresponding common data field.

As an example, one data platform may use a REST endpoint to interface with the data and visualizations. The REST response can be queried to find particular data, such as an "employee" field. The fields can be retrieved for meshing data. Another data platform may use a SOAP requests, and a similar query or parsing can be done to find matching/corresponding 'employee' fields for meshing. Preferably, none of the data is stored on the meshing system, and the data remains on the original platforms.

Embodiments of this invention rationalize different parameters across BI&A systems. For example, IBM Cognos may have a parameter for Date called 'Period.' Tableau also takes advantage of a Date data field/column, but the parameter has been defined as 'Date.' In Microsoft PowerBI, Date may be defined as 'fiscal_yr.' Ideally, the parameter names would be standardized, but this will be highly improbable in most organizations and these data stores are typically managed by different internal groups, or even outsourced to other organizations. The invention creates manual and/or automatic mappings of parameters across systems to mesh the differently identified data together for the end user.

In another embodiment of this invention, there are scenarios where end user analysis is required from multiple different 'workbooks' or 'packages' (data sources) coming from a single platform. For example, Tableau users may have to leverage different workbooks to perform their analysis. The issue is that each workbook has a different set of default filters applied. These filters may not be front and center for the end users, so when objects are rendered as part of a single composite view, decisions may be made assuming that the data being displayed is related and filtered with the same criteria. Embodiments of this invention informs the user that the filters are not aligned across the workbooks and provides an automated way to remediate the inconsistencies.

In embodiments of this invention, the method and system saves a definition to be used as an 'accelerator' or 'template' for other users, so that any filtering definitions can be reused. The ability to further edit or refine any stored definition is also possible.

In embodiments of this invention, the system includes a machine learning engine that can automatically leverage similarly named data fields, columns and/or data types and make or suggest mappings. Users can reject the mapping or accept and further refine as needed.

In embodiments of this invention, the system includes individual dynamic prompt value generation. When a user invokes the mapping/filtering features, prompt values available for the user would be generated at runtime. The system can pull prompt values from the different users and/or systems and create a single comprehensive list. Prompt values are retrieved as the logged in user so only the values that they have access to see would be displayed.

In some embodiments, the system can recognize when a prompt value has been selected in a single displayed dashboard report, regardless of the BI system, and then have that parameter value automatically passed to the other BI content on the dashboard. This has an advantage of eliminating the need to pre-generate prompt values as the values will always be present in the visualizations.

Other objects and advantages will be apparent to those skilled in the art from the following detailed description taken in conjunction with the appended claims and drawings.

BRIEF DESCRIPTION OF THE DRAWINGS

FIGS. 3 and 4 illustrate a mapping unification of disparate database parameters according to one embodiment of this invention.

DETAILED DESCRIPTION OF THE INVENTION

Figure 1:
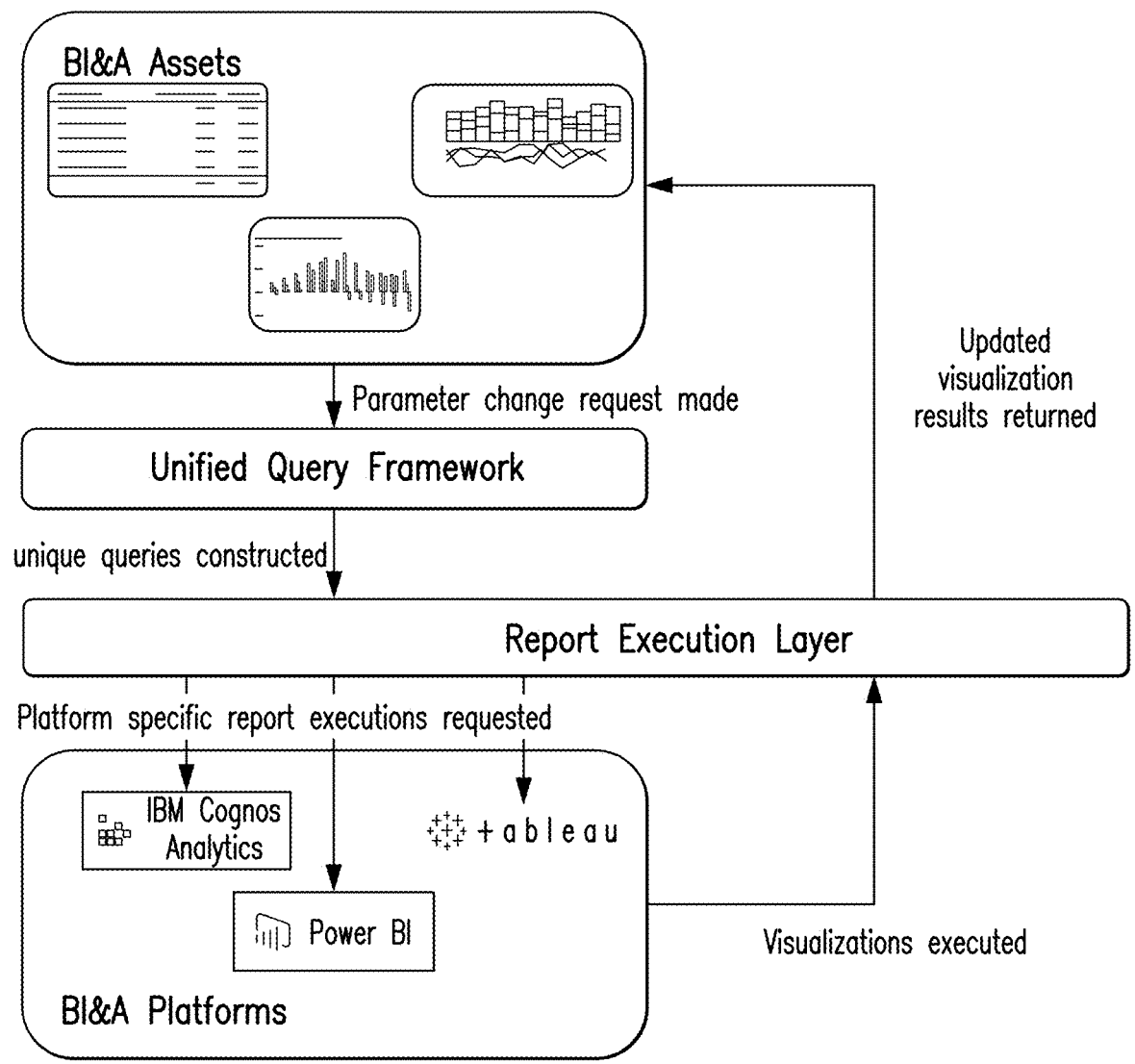
FIG. 1 illustrates a general operation of the system and method according to one embodiment of this invention.

The system and method of this invention desirably and beneficially provide a way for end users to modify a filter value(s), whereby visualizations of the filtered data from multiple, disparate platforms automatically update for the user. In embodiments of this invention, a programmatic user interface accepts parameter names and values, translates and transforms them for the required BI&A platforms, and then issues the required query string and syntax to the native BI&A platform API. A 'translation layer' module, such as including the Unified Query Framework in FIG. 1, accepts user inputs, reformats them for the specific platforms to be queried, and then submits the updated queries to the respective platforms. The Report Execution Layer module aggregates the queried data from the disparate BI platforms using the links provided by the translation module and provides a meshed data report (e.g., see FIGS. 5-11), where analogous data from the different BI platforms is shown in a single, manipulatable dashboard display.

In embodiments of this invention, an abstraction layer module is used to add new BI or BI&A platforms, and provide the necessary query translation information for the querying process to expand the system as needed. Query structure can be important to the operation of embodiments of this invention, namely the correct formulation of the queries required to obtain and mesh the data from the third party sources for presentation to the end users. As the users will be performing analysis on live reports, there is an inherent expectation that responsiveness will be similar to performing these actions directly in the underlying BI system. The formulated queries are forwarded to query APIs of the BI systems.

Figure 2:
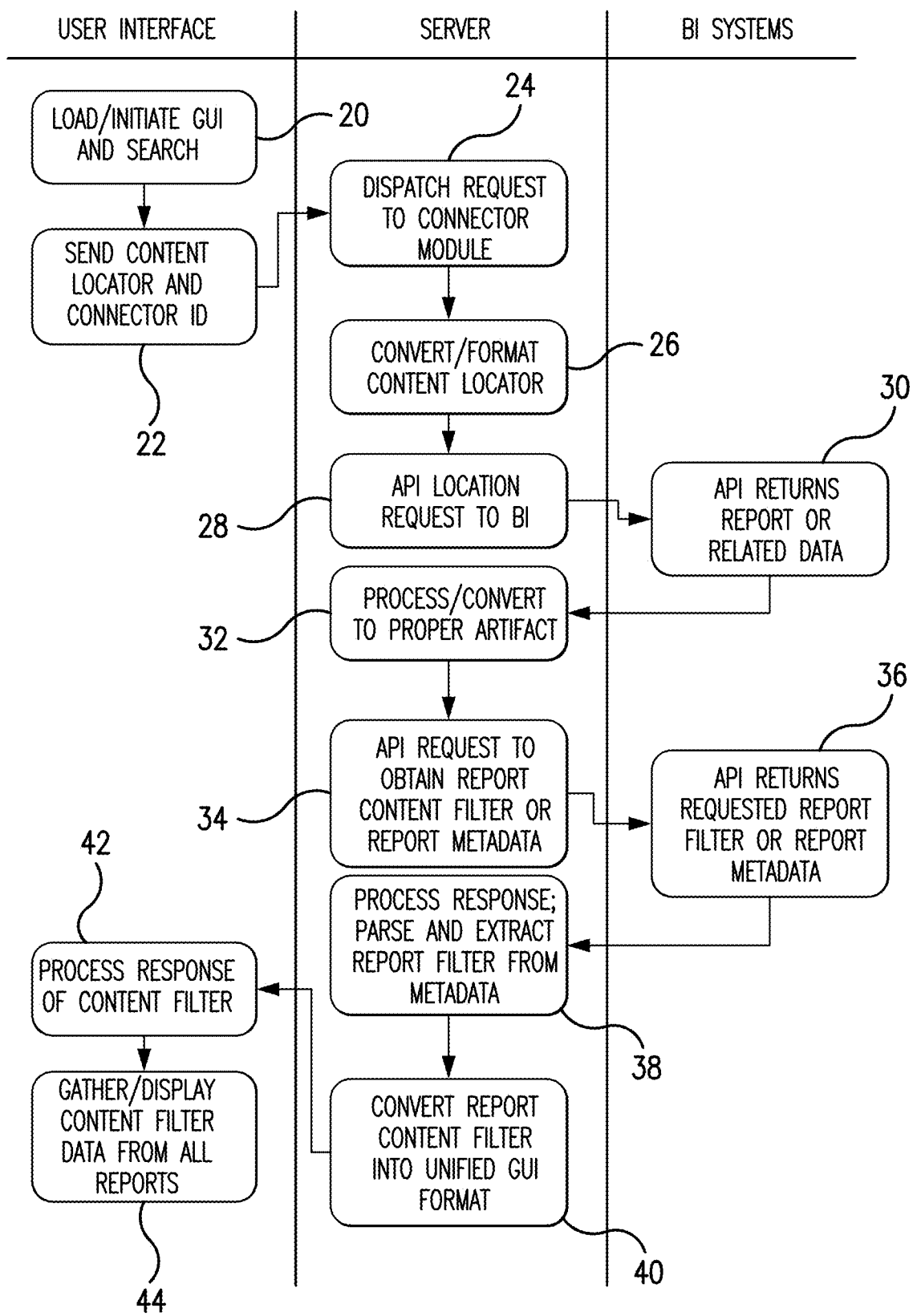
FIG. 2 is a flow diagram according to one embodiment of this invention.

FIG. 2 is a flow diagram of a data aggregation and filtering process according to embodiments of this invention. In step 20, a user accesses the user interface created by the data processing system of this invention. The user enters the parameters for the requested BI reports, and in step 22 a request is initialized including the content locator and the connector identification of the content. In embodiments of this invention, the connector is a series of properties/parameters required to connect to an individual BI&A platform. The content locator is the way the system uses the internal ID of the object to build the URL required to access the content from the BI&A system. The system user may enter a server type, the URL, and/or the path of the BI&A platform(s) to tell the system what to query.

In step 24, the information request is dispatched to the appropriate connector module(s) for the relevant BI systems. In step 26, the connector module converts the content locator to the specific format of the corresponding BI system. In step 28, an API request is sent to locate the report/information from the BI system. The API request can be any suitable format, such as REST, Webservice, Websocket, SOAP, etc. In step 30, the API returns the requested report or related data. In step 32, the server system processes the response and converts the report or data to the proper artifact in the connector module, and then in step 36 sends an API request to the BI system to obtain the report or report metadata.

In step 38, the server processes the response information, such as by parsing and extracting report information. In step 40, a content filter converts the report into a unified format to send back to the user interface for display. In step 42, the content filter response is further processed for display. In step 44, the content from all BI reports, and the corresponding content filters, are gathered and used to populate the user interface for user use and filtering.

In embodiments of this invention, two sets of data can be obtained from the BI&A systems. The first set includes content that contains matching parameter types/names across the various BI&A platforms. The second set of content has mismatching parameter names across the various BI&A testing platforms, such as described above. In embodiments of this invention, a programmatic interface can be used to:

- submit a parameter modification request (using identically named parameters) and have that request transformed for each BI&A testing platform, submit the respective transformed queries, and get an accurate response from each system;
- submit a parameter modification request (using differently named parameters) and have that request transformed for each BI&A testing platform, submit the respective transformed queries, and get an accurate response from each system;
- submit a single parameter modification request and have that request transformed for each BI&A testing platform, submit the respective transformed queries, and get an accurate response from each system; and/or
- submit a multiple parameter modification request and have that request transformed for each BI&A testing platform, submit the respective transformed queries, and get an accurate response from each system.

Figure 3:
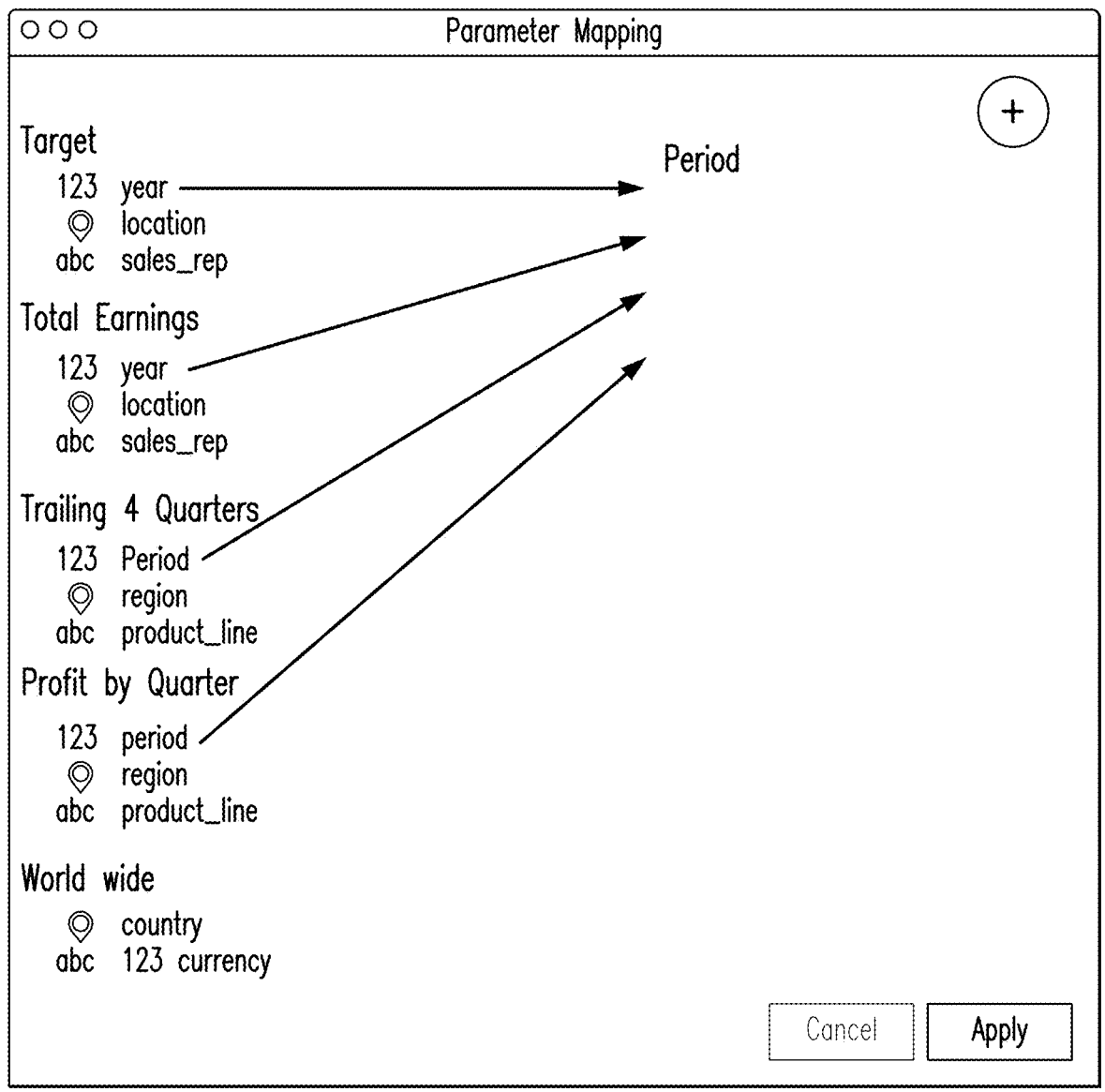

FIGS. 3 and 4 show an example mapping of mismatched data parameters/fields/labels across disparate BI systems, according to embodiments of this invention. The left side of FIG. 3 shows representative parameters from different BI systems, for example where two systems use the parameter labels "year" and two systems use "period." These analogous or similar time parameters are mapped in the unification or translation server layer to a common field/term "period" as shown in FIG. 4. As also shown in FIG. 4, additional mapping can be created for other parameters, such as the illustrated territory.

In embodiments of the invention, the mappings are created individually, for and optionally with input by the user. In other embodiments, the mappings are stored and used for future users, and across multiple users. As an example, each user can receive a prompt list of existing mappings or mapping definitions. The future or additional user can have the option to expand or retract the mapping definitions. In preferred embodiments, the system has a machine learning engine to create or suggest possible mappings, such as by leveraging similarly named columns and/or data types across the BI platforms. Mapping definitions and values from other dashboard uses can be pulled and displayed at runtime for a user.

Figures 2, 5:
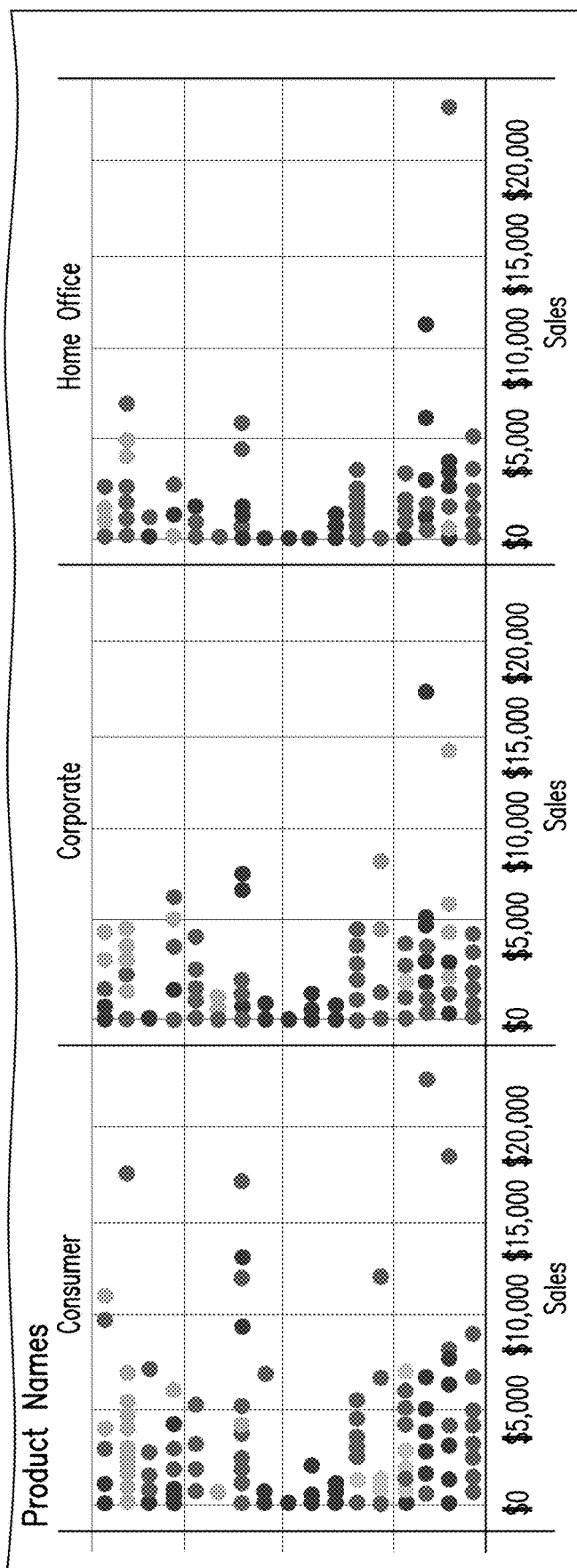
FIGS. 5 (5-1, 5-2, and 5-3), 6 (6-1, 6-2, and 6-3), and 7 (7-1, 7-2, and 7-3) illustrate a filtering operation according to one embodiment of this invention.
Figures 3, 5:
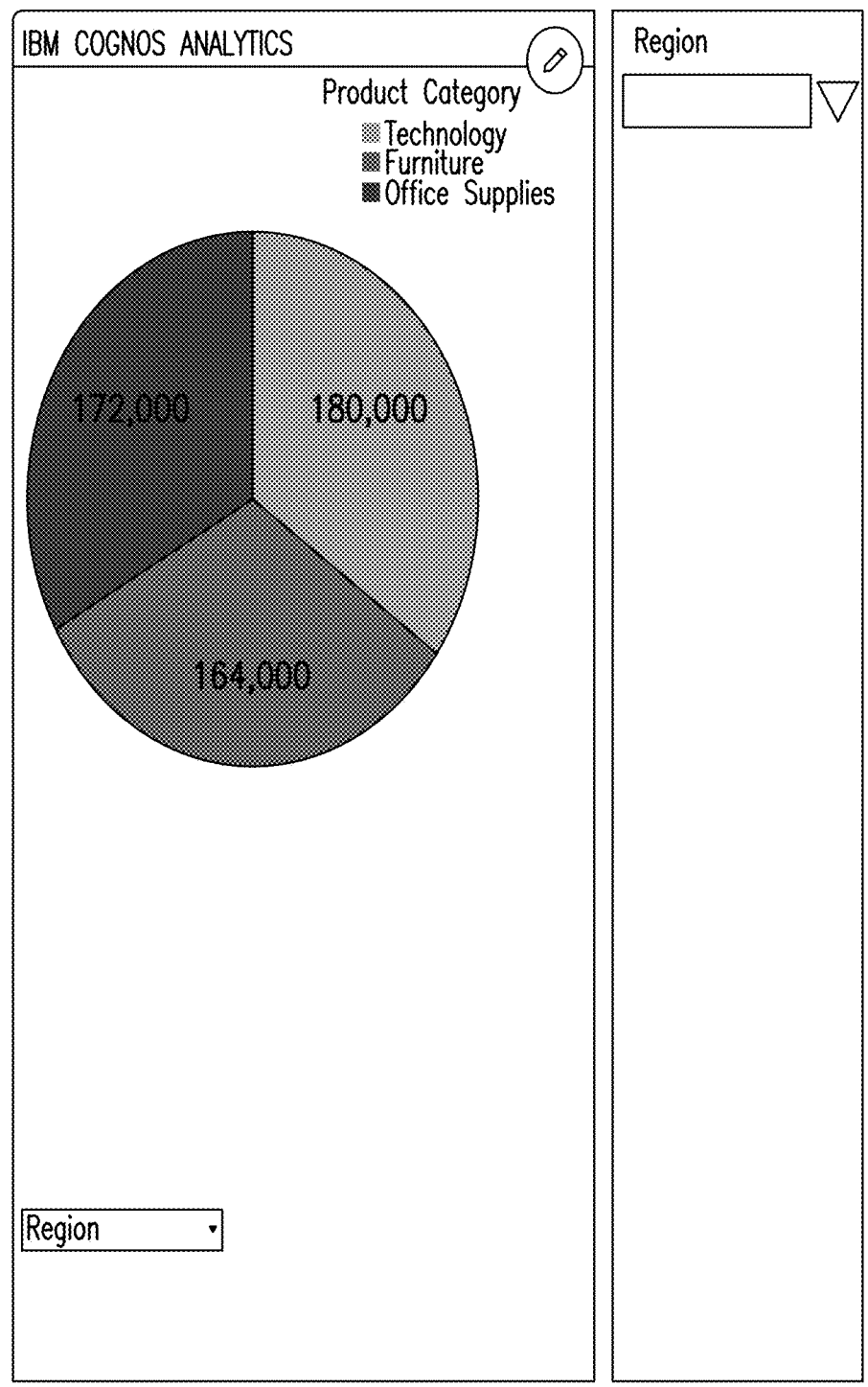
Figures 2, 6:
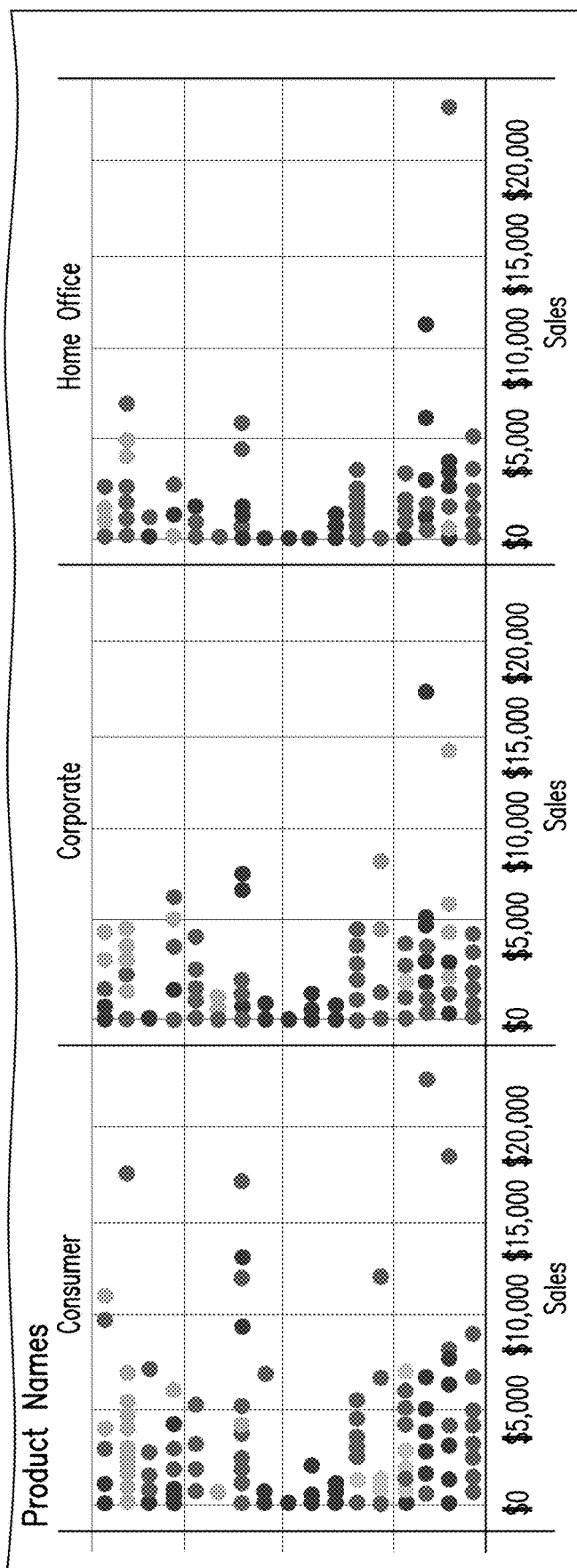
Figures 3, 6:
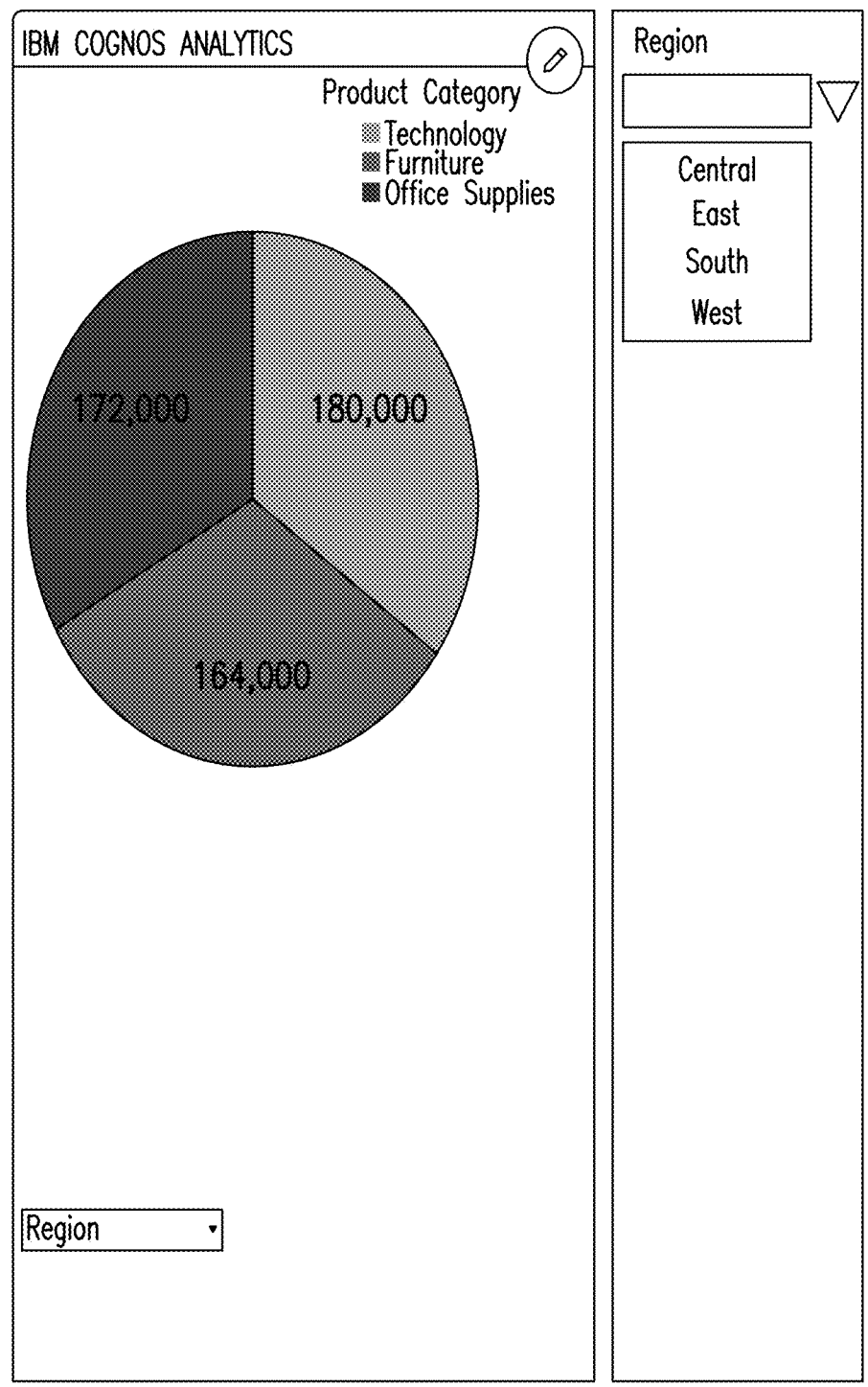
Figures 2, 7:
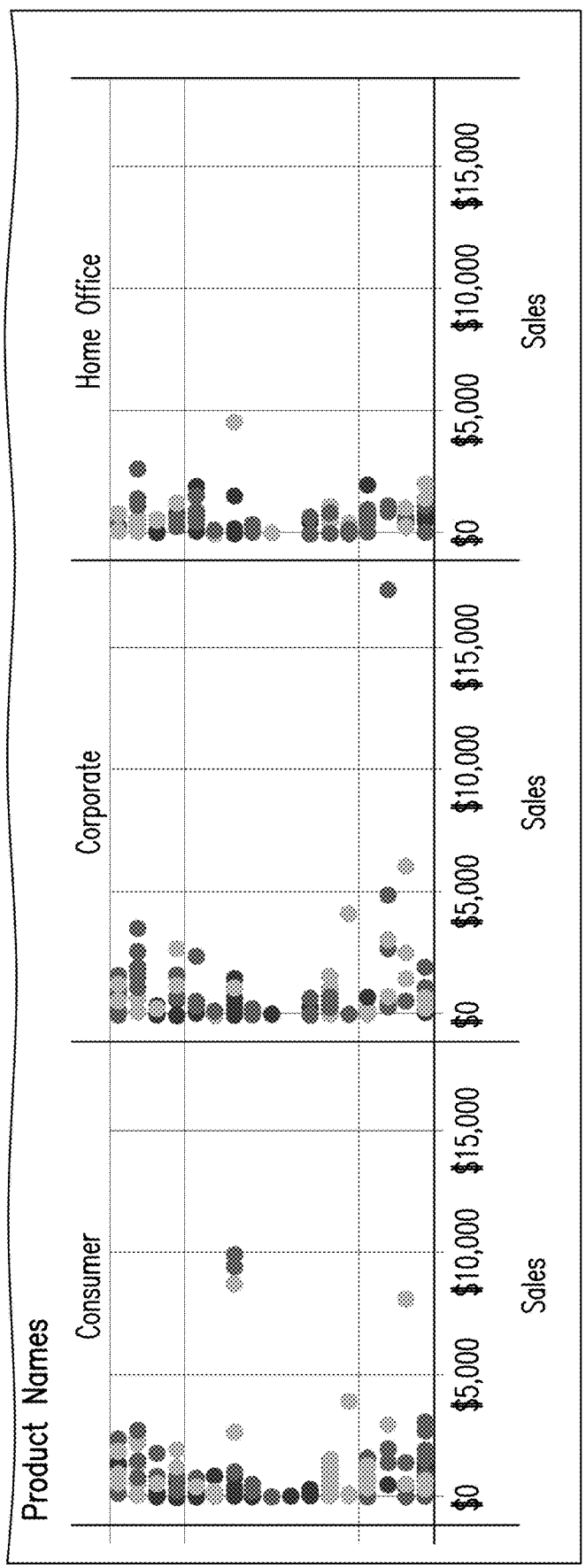
Figures 3, 7:
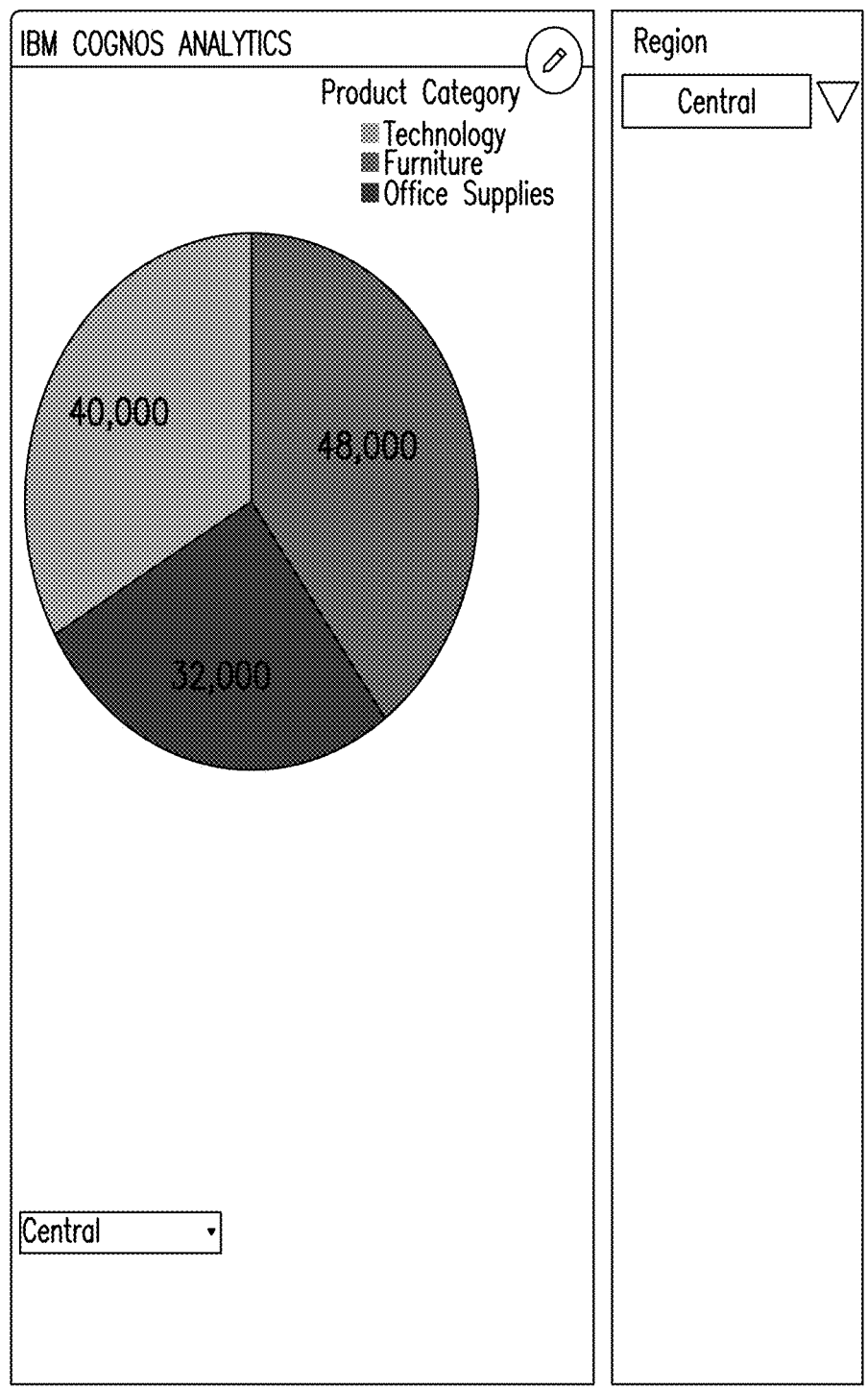
Figure 8:
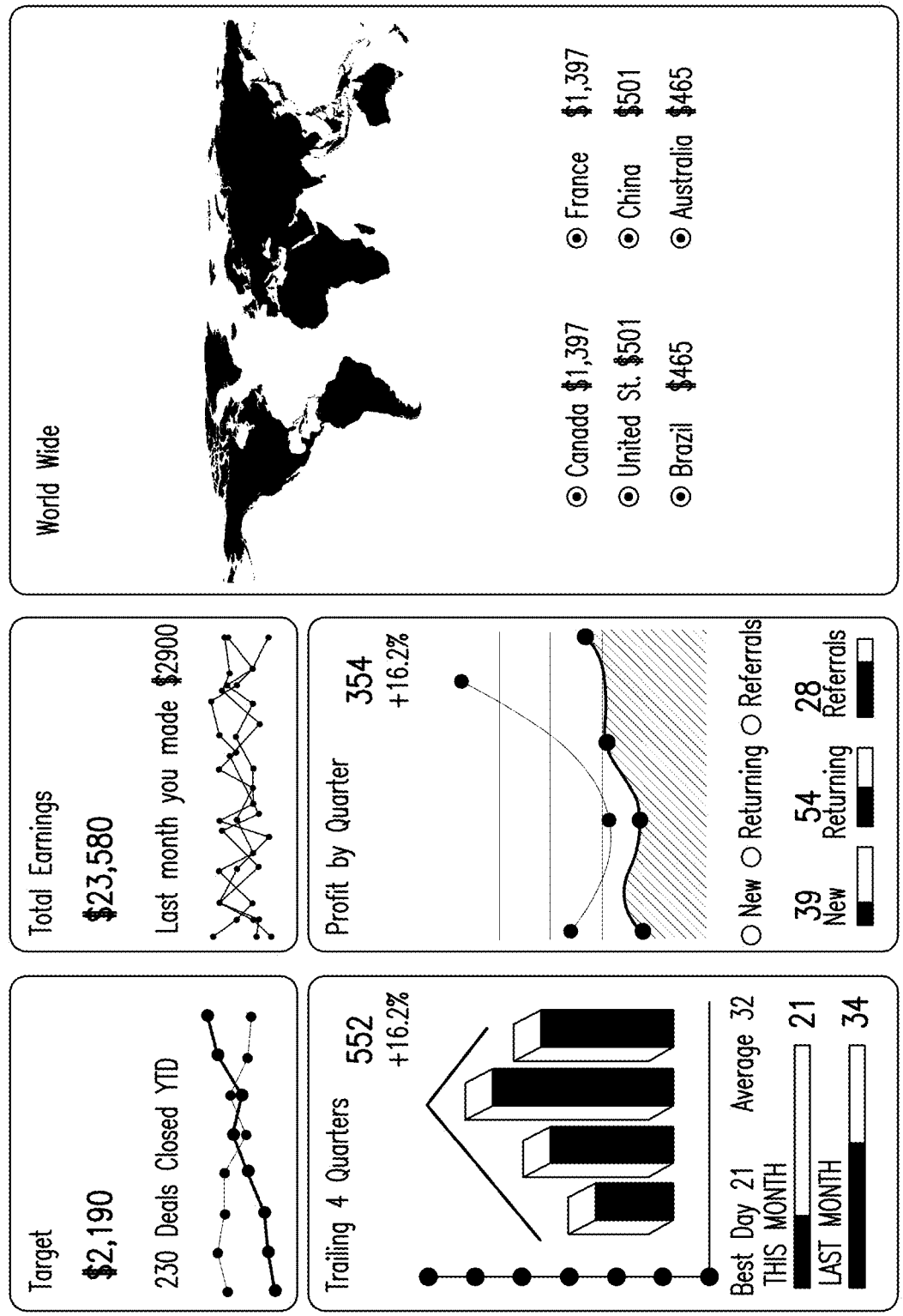
FIGS. 8-10 illustrate a filtering operation according to one embodiment of this invention.
Figure 9:
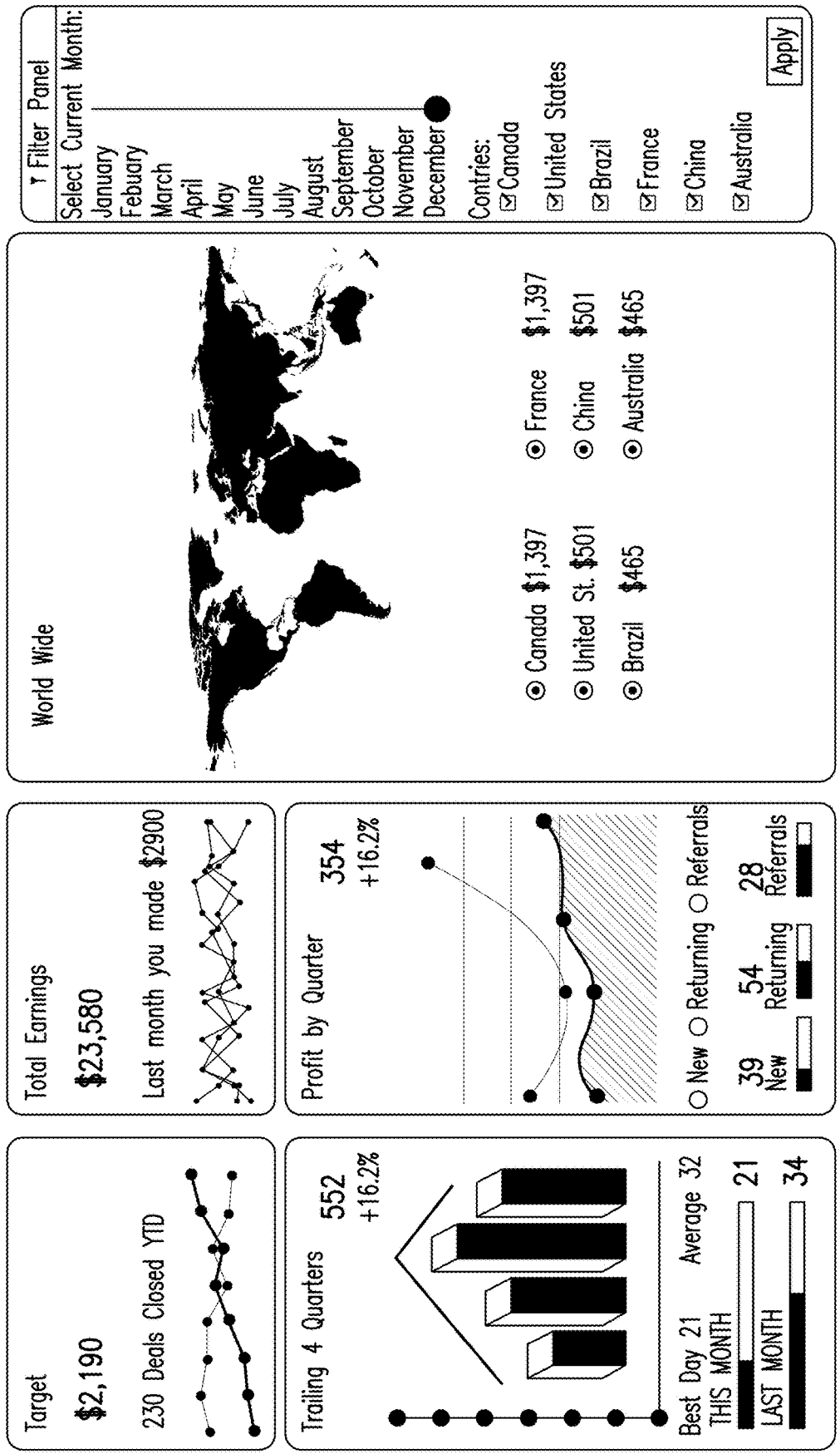
Figure 10:
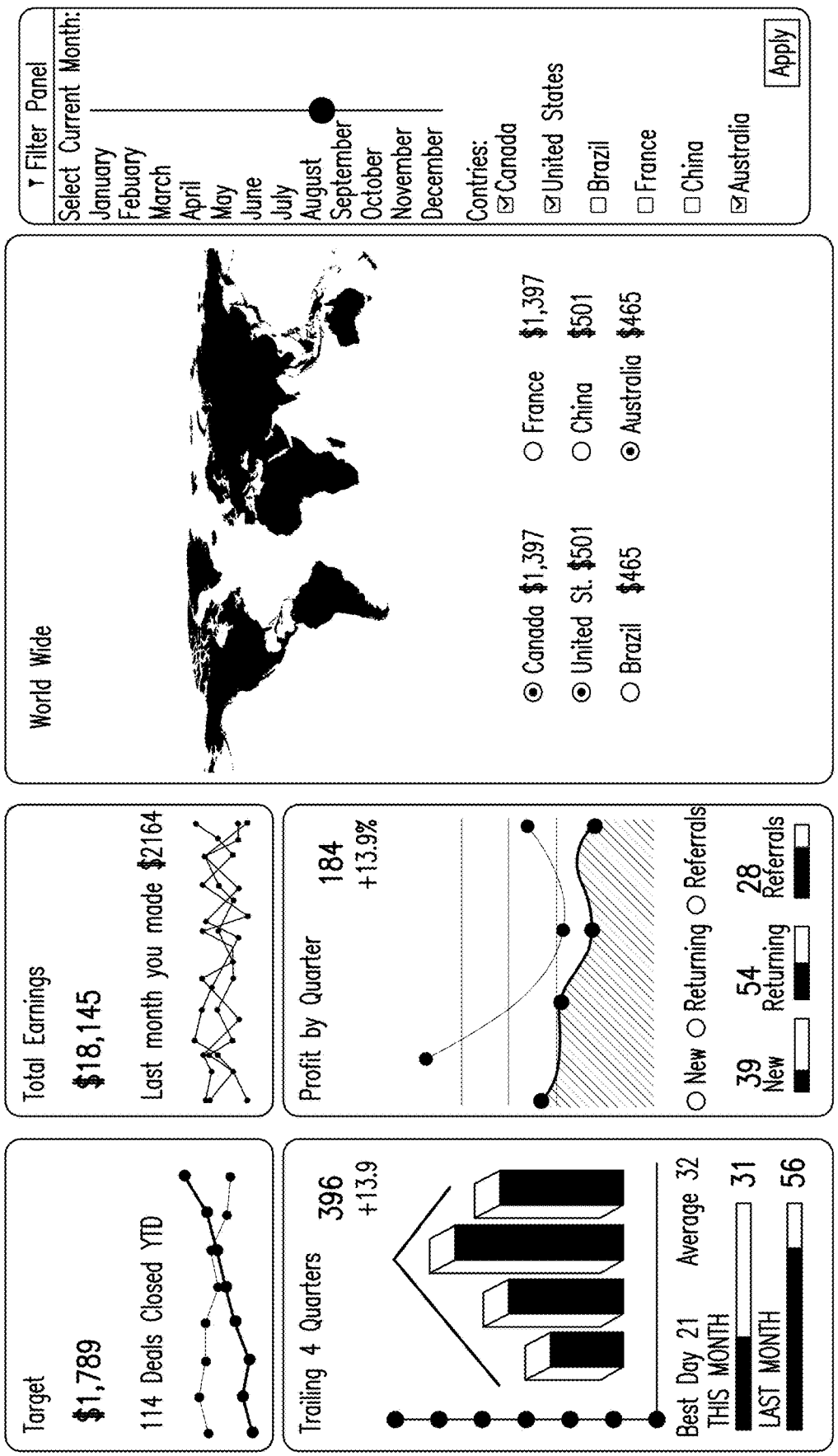

FIGS. 5-10 illustrate exemplary systems that support viewing content from different analytic sources (examples IBM Cognos Analytics and Tableau). The analytic platform provides users the ability to filter reports across the two illustrated sources with less manual manipulation. Embodiments of the invention provide a series of common controls that users leverage to filter results across different reports/sources. FIGS. 5 and 8, respectively, show two example dashboard graphical user interfaces (i.e., GUI) with reports and sources. When a value in a control is selected, as shown in FIGS. 6 and 9, the system of the invention programmatically sends the filter query to each analytics platform and re-executes the report. The updated, filtered results are displayed in FIGS. 7 and 10, respectively.

Figures 1, 11:
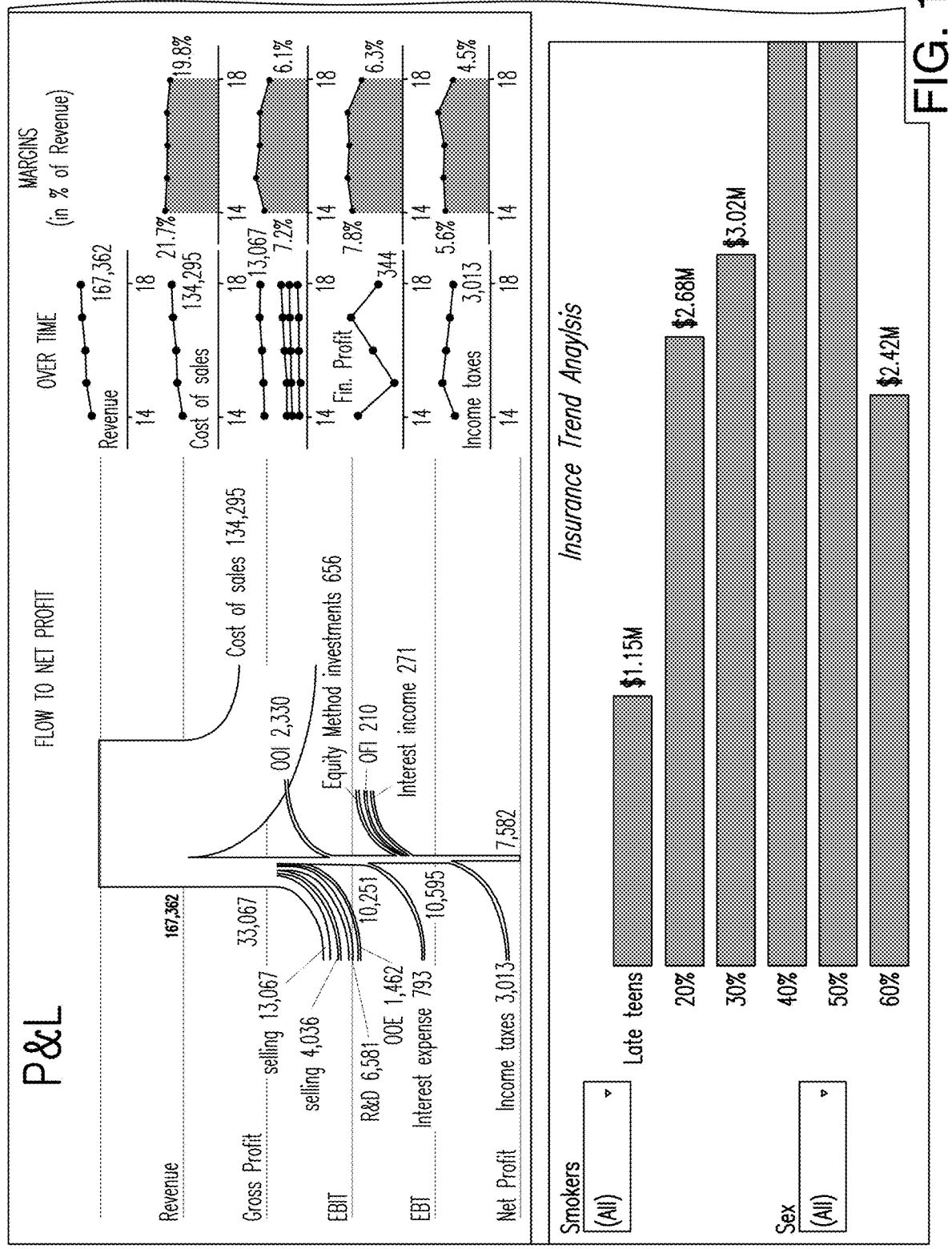
FIGS. 11 (11-1 and 11-2), 12 (12-1 and 12-2), 13, 14, 15, 16, 17, and 18 (18-1 and 18-2) illustrate a mapping application and method according to one embodiment of the invention.
Figures 2, 11:
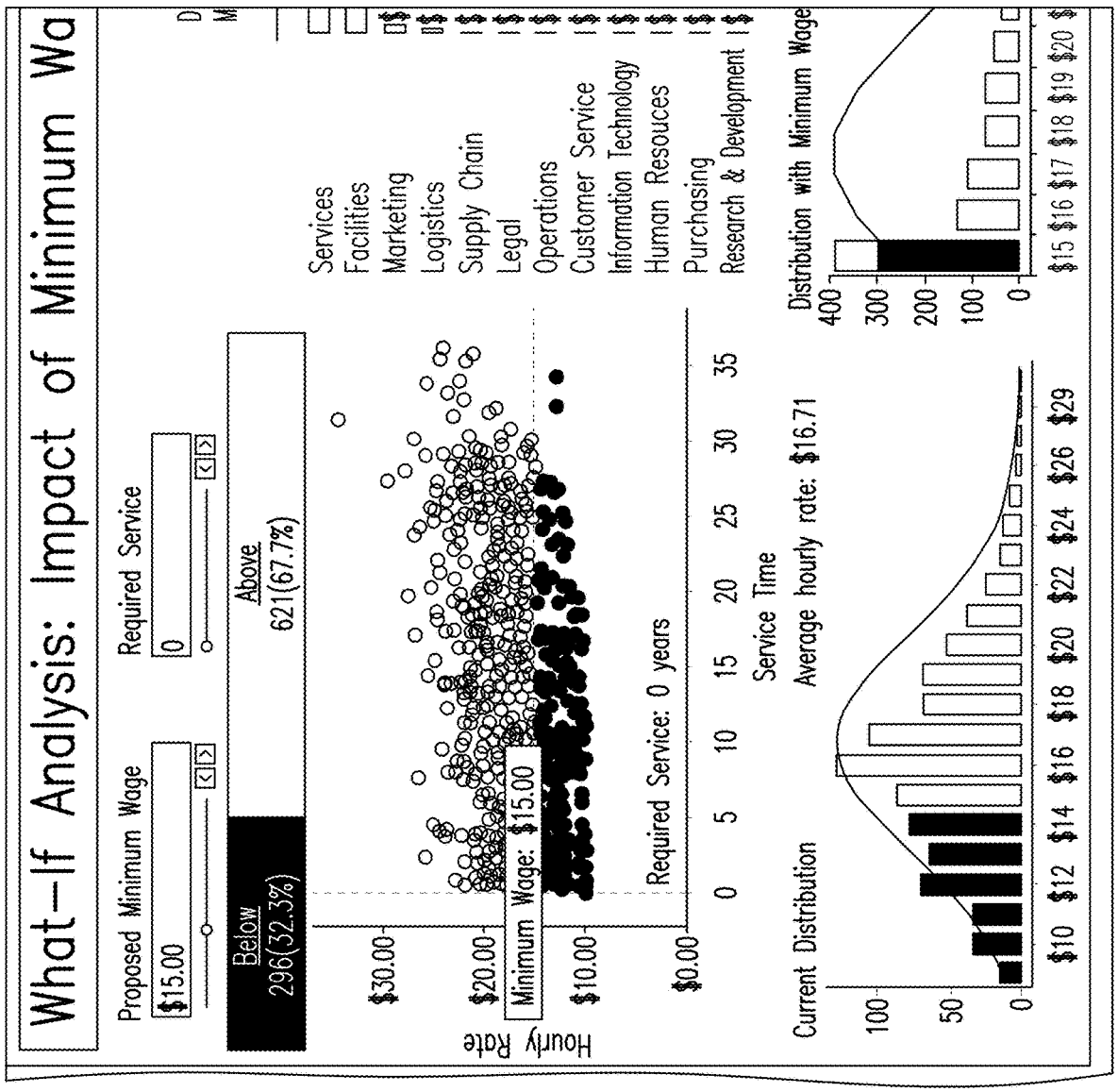
Figures 1, 12:
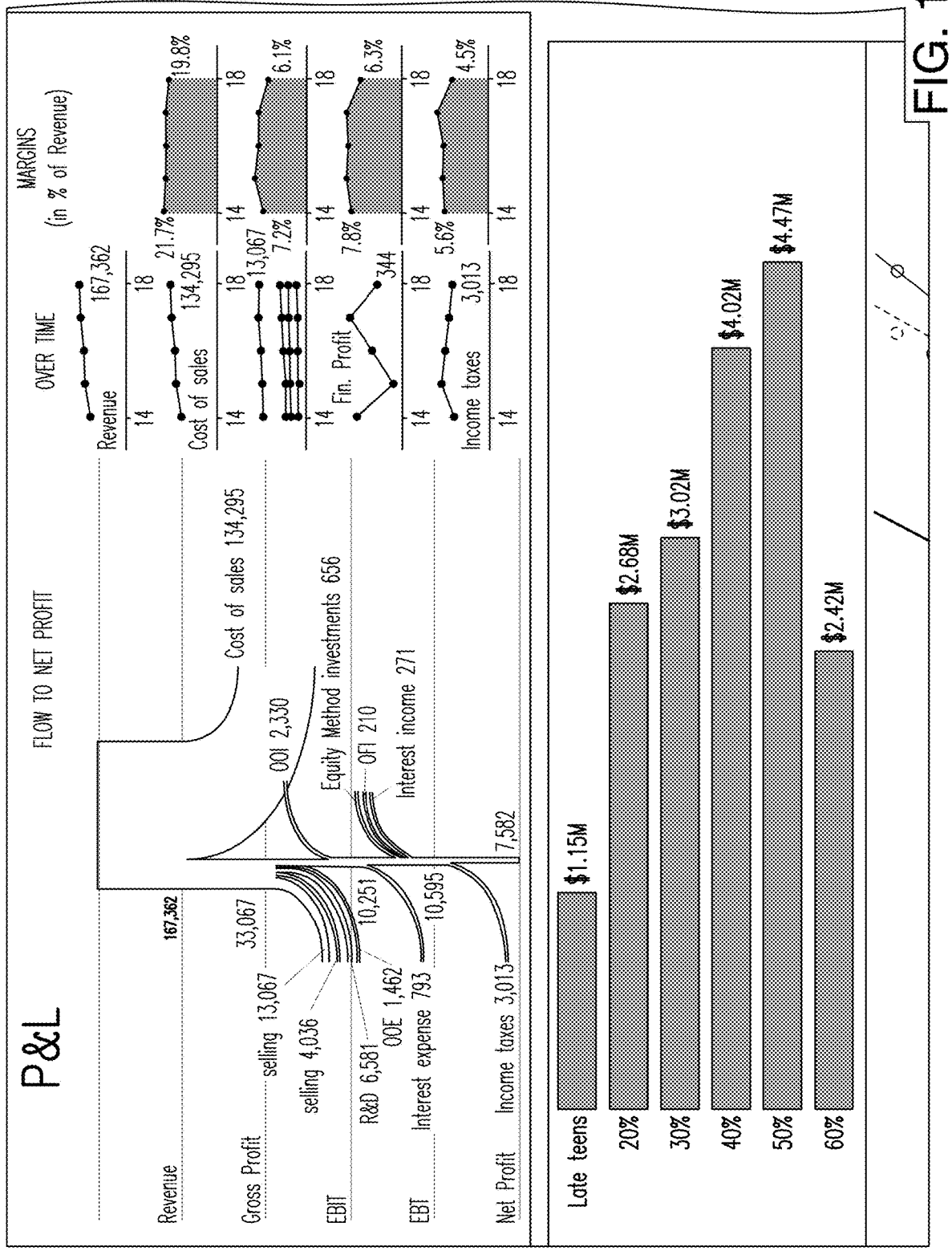
Figures 2, 12:
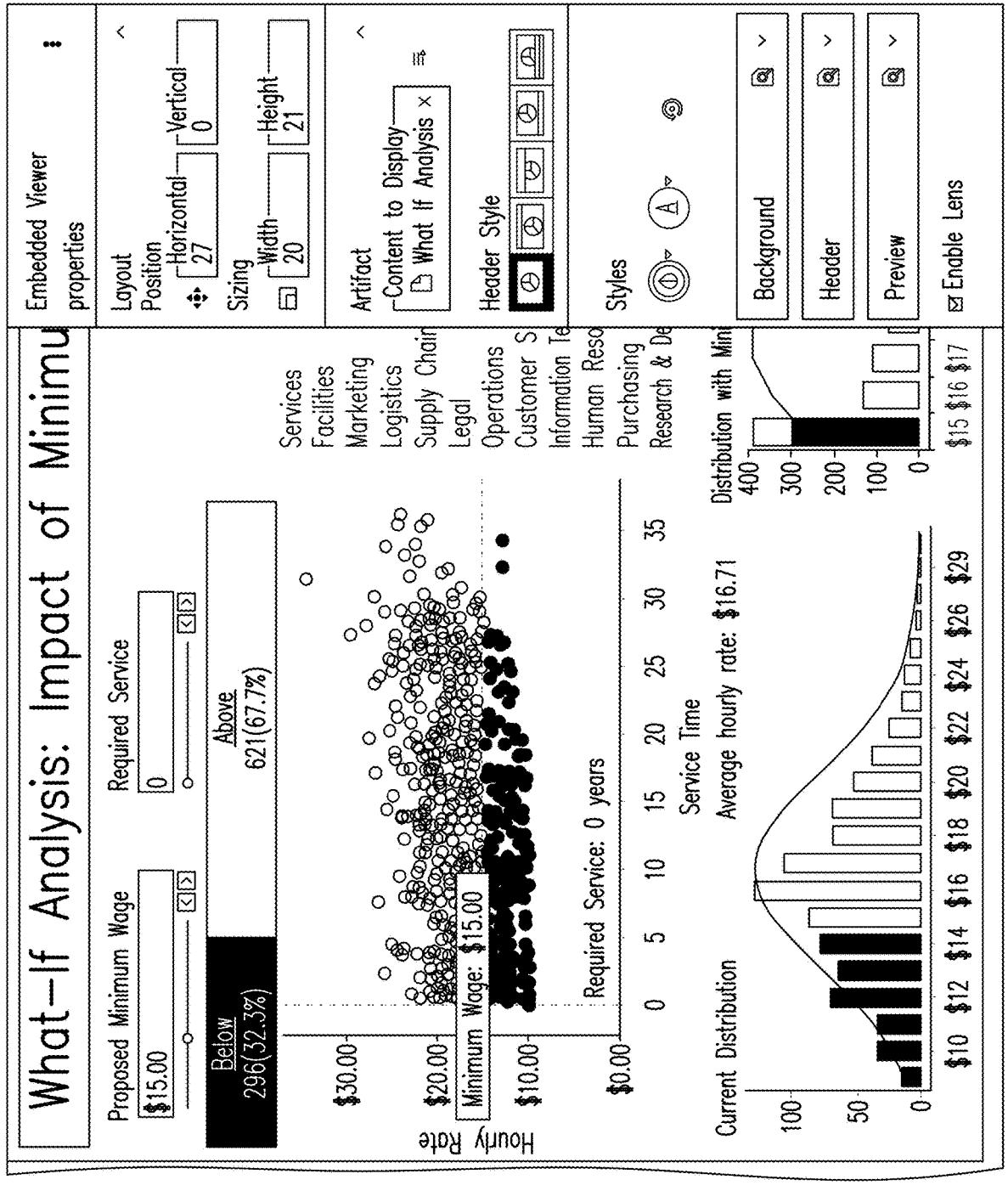
Figure 13:
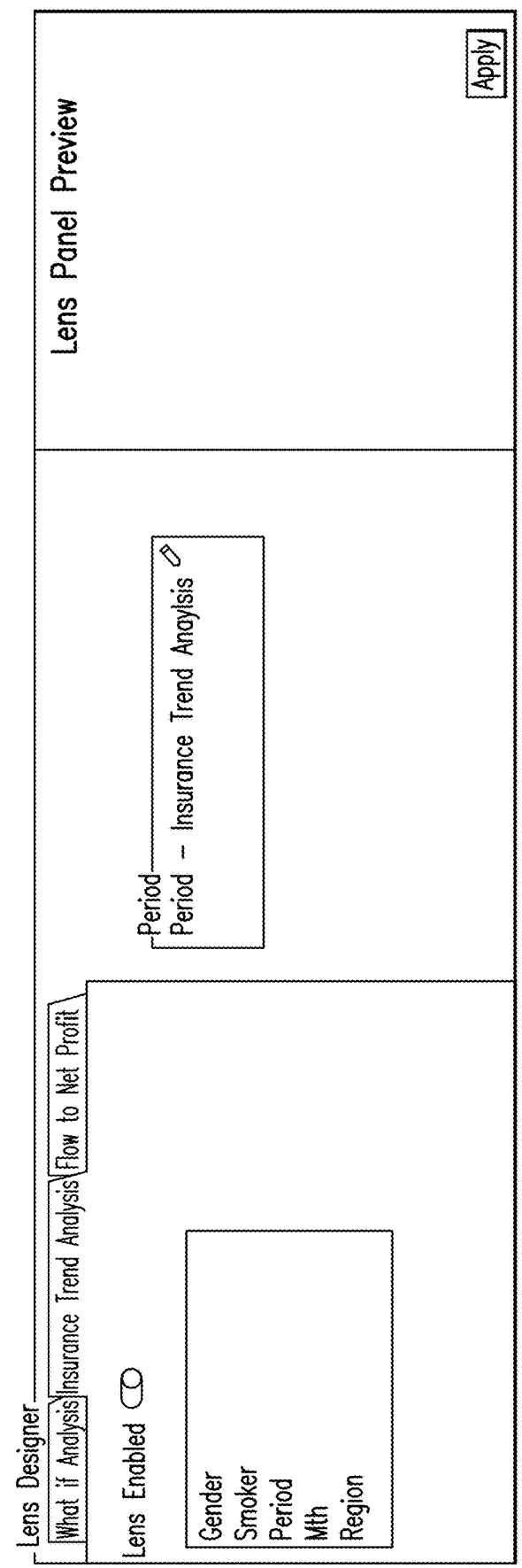

FIGS. 11-18 illustrate a mapping application according to one embodiment of the invention. FIG. 11 shows a dashboard GUI with three reports each originating from one of three different BI systems. FIG. 12 shows a GUI dropdown menu, where the mapping application (referred to an "Lens") can be enabled. Enabling the Lens application opens the Lens mapping tool or "designer" of FIGS. 13-17. The Lens designer allows users to map parameters from the different reports. In the left designer panel is a list of the different reports in the dashboard of FIG. 11 (three reports). FIG. 13 shows the "Insurance Trend Analysis" report tab active, and a list of parameters is displayed for that report. The "Period" parameter has been dragged or otherwise added to the mapping canvas in the middle section. This action creates a mapping definition and includes in the label the parameter and report from where it came.

Figure 14:
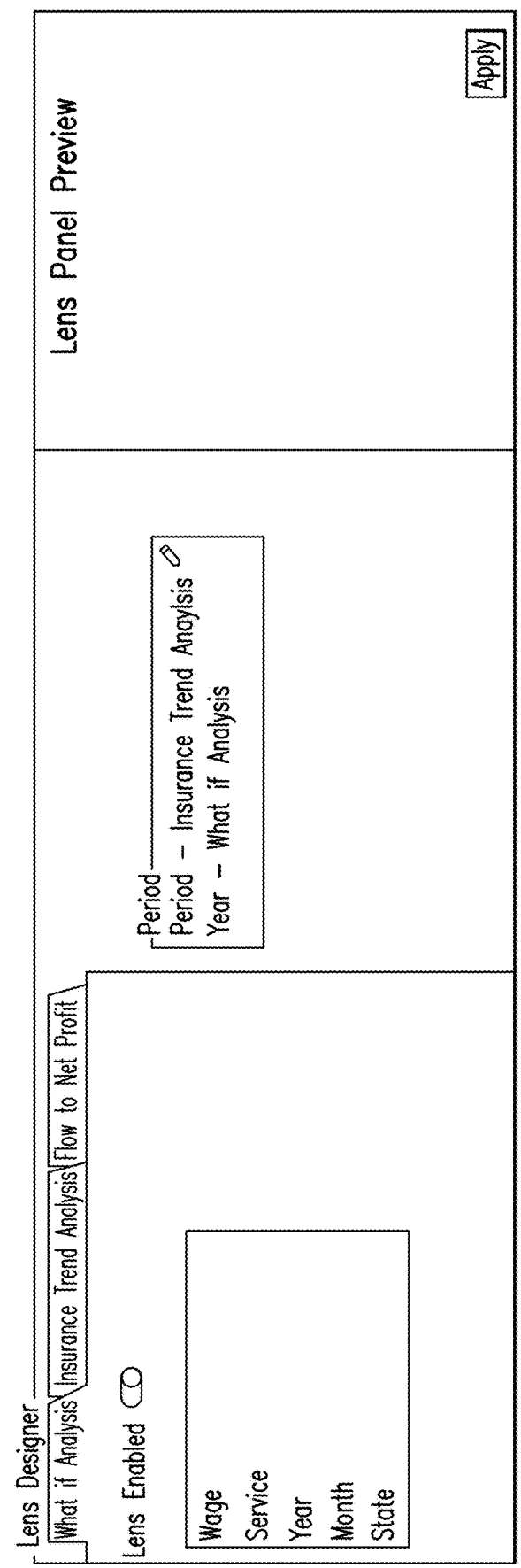
Figure 15:
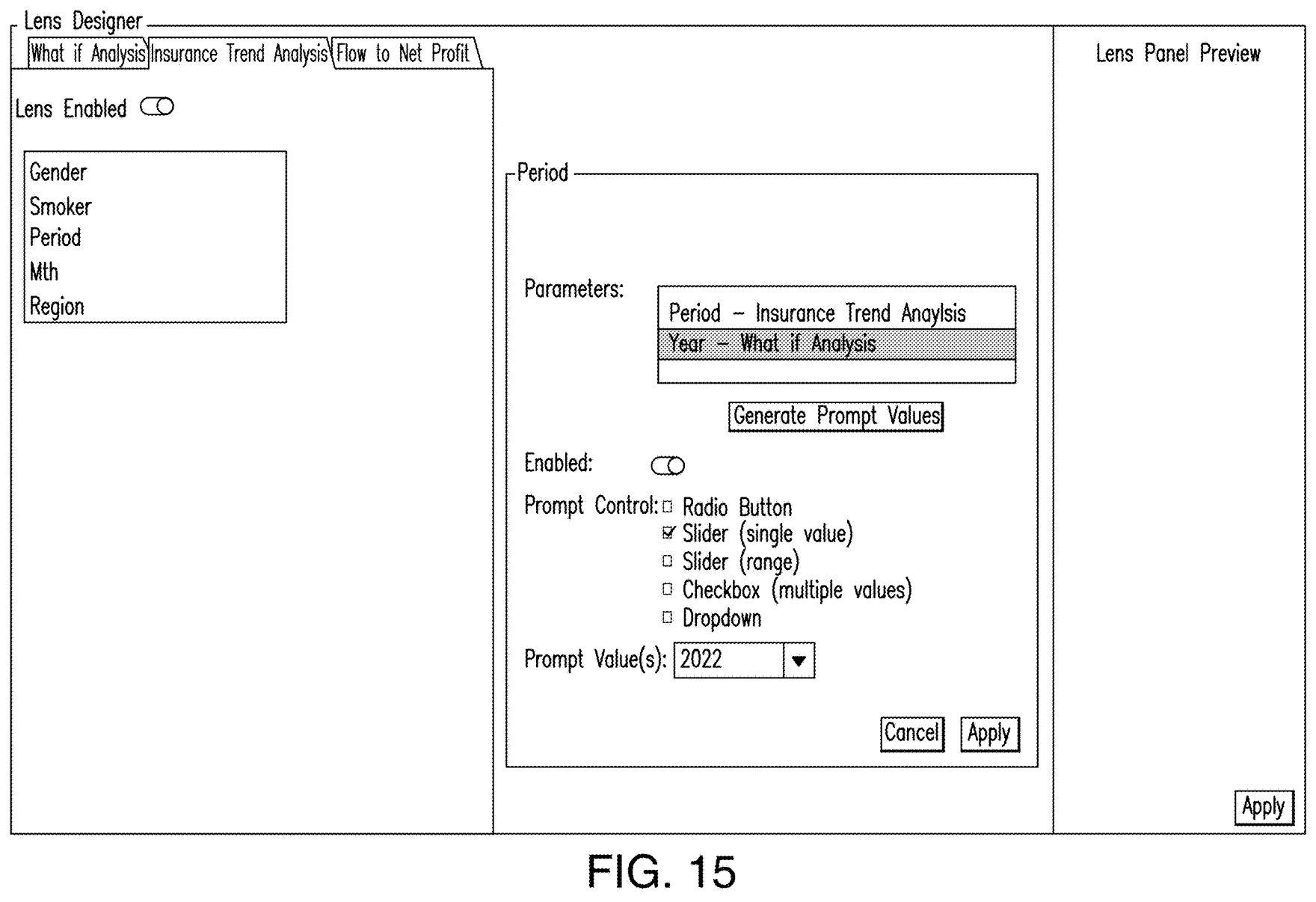

In FIG. 14, the user has changed the report view to the "What If Analysis" report tab. The "Year" parameter is added into the mapping definition to link Year and Period from the two reports. The mapping definition can further be edited, as shown in FIG. 15. The Lens designer can enable users to select from different provided prompt values. The user selects one of the terms in the mapping list, and then presses the "Generate Prompt Values" button which automatically queries that report for the values useable as prompts (such as the years available from the report). Once the query completes, the "Prompt Value(s)" dropdown is populated. The user can then select and assign the prompt values. Once the mapping definition is applied, the Lens Panel Preview pane displays how the prompt will display to user(s).

Figure 16:
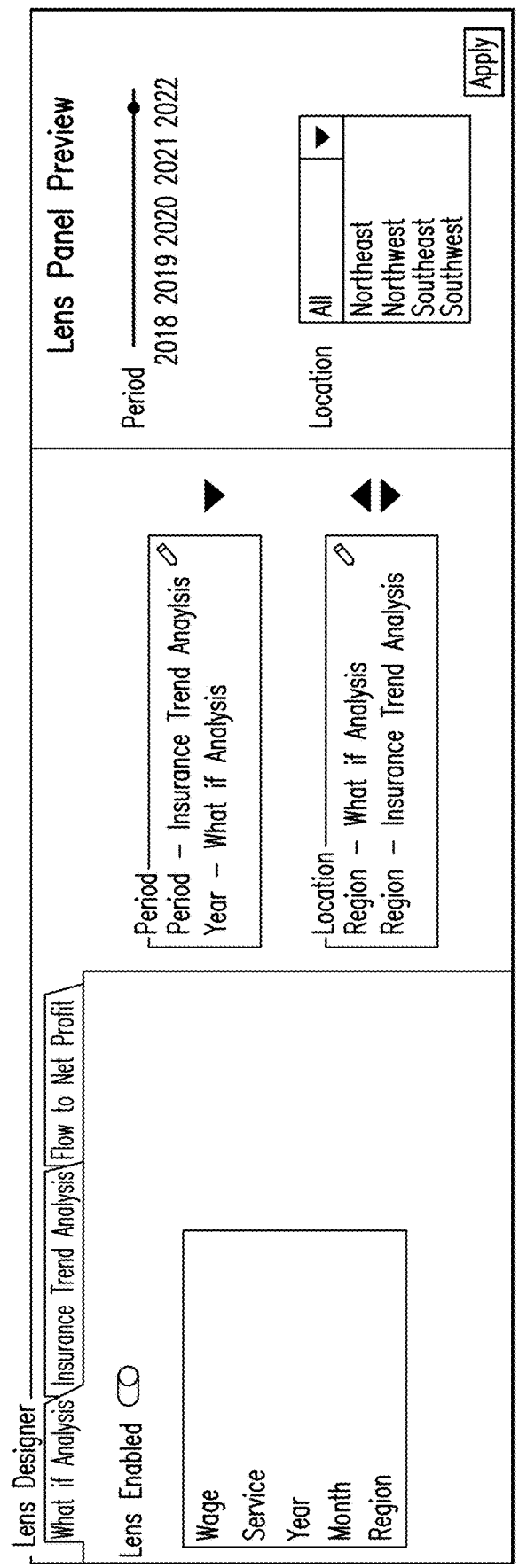
Figure 17:
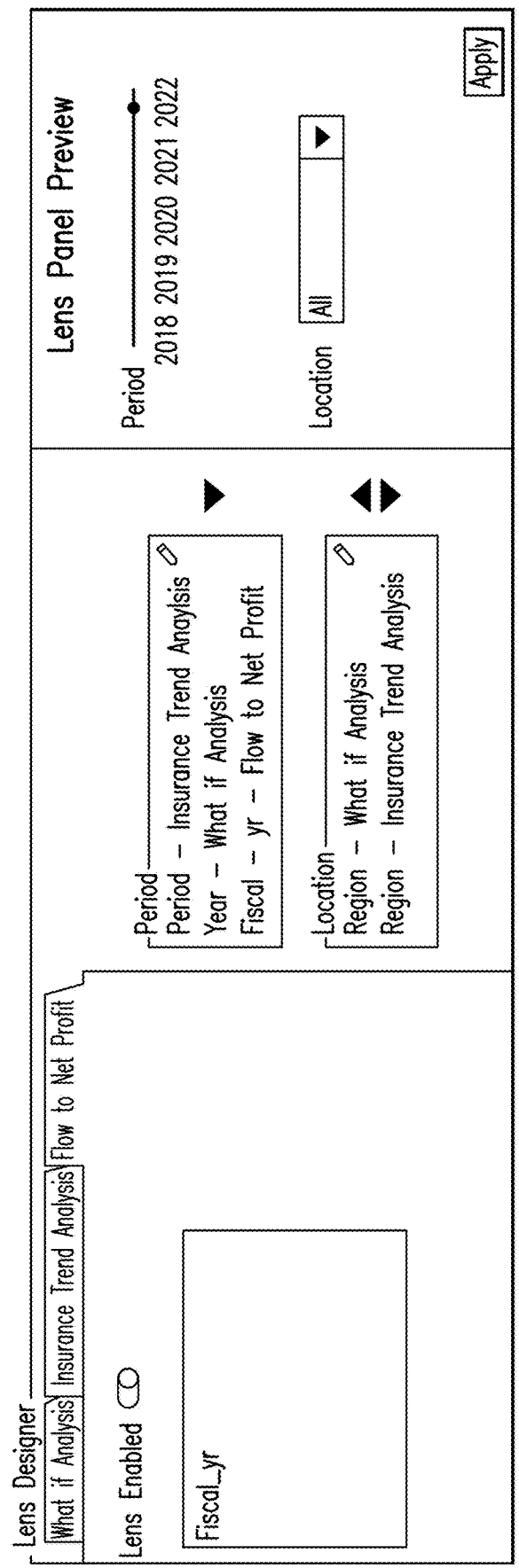
Figures 1, 18:
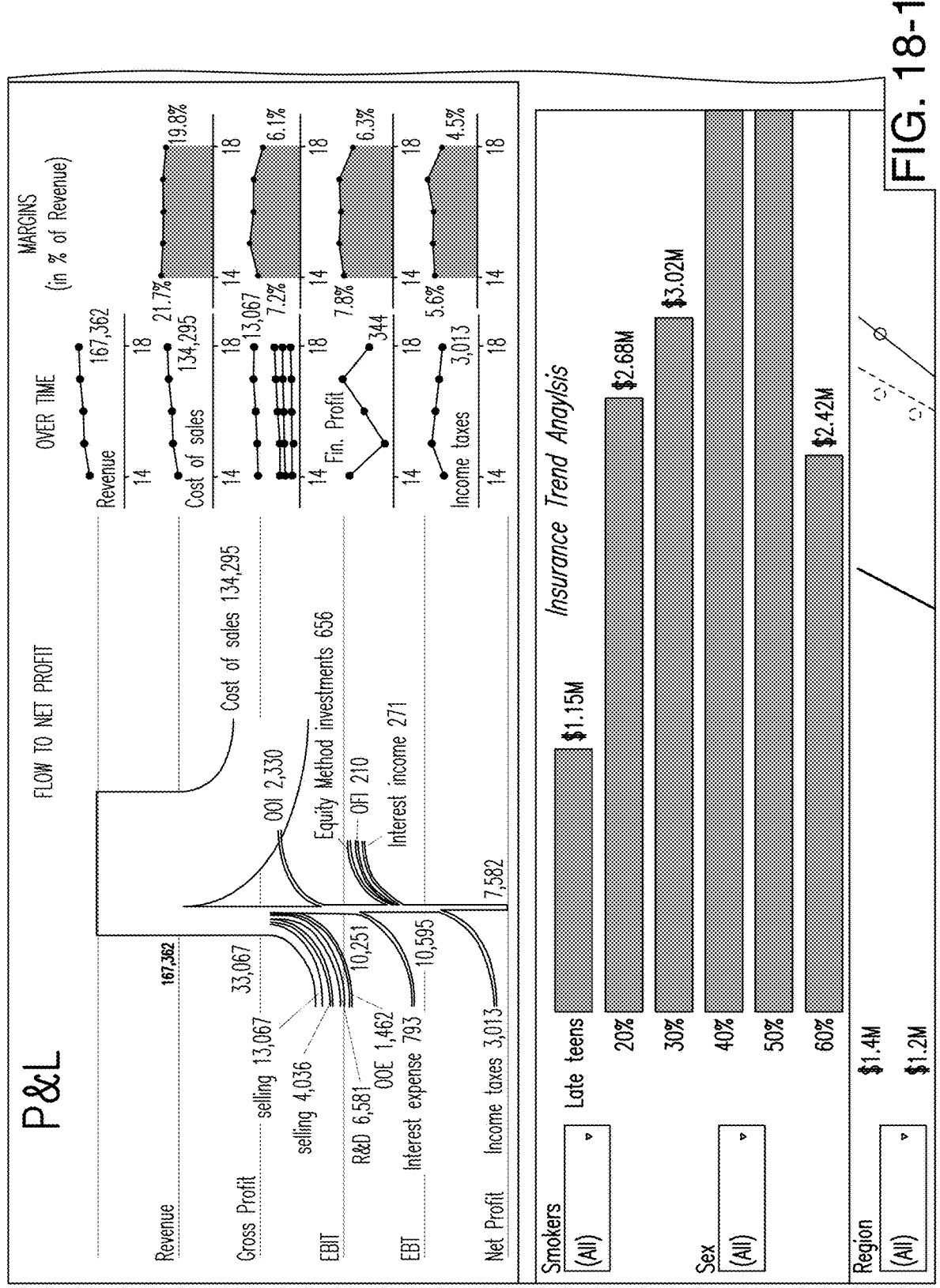
Figures 2, 18:
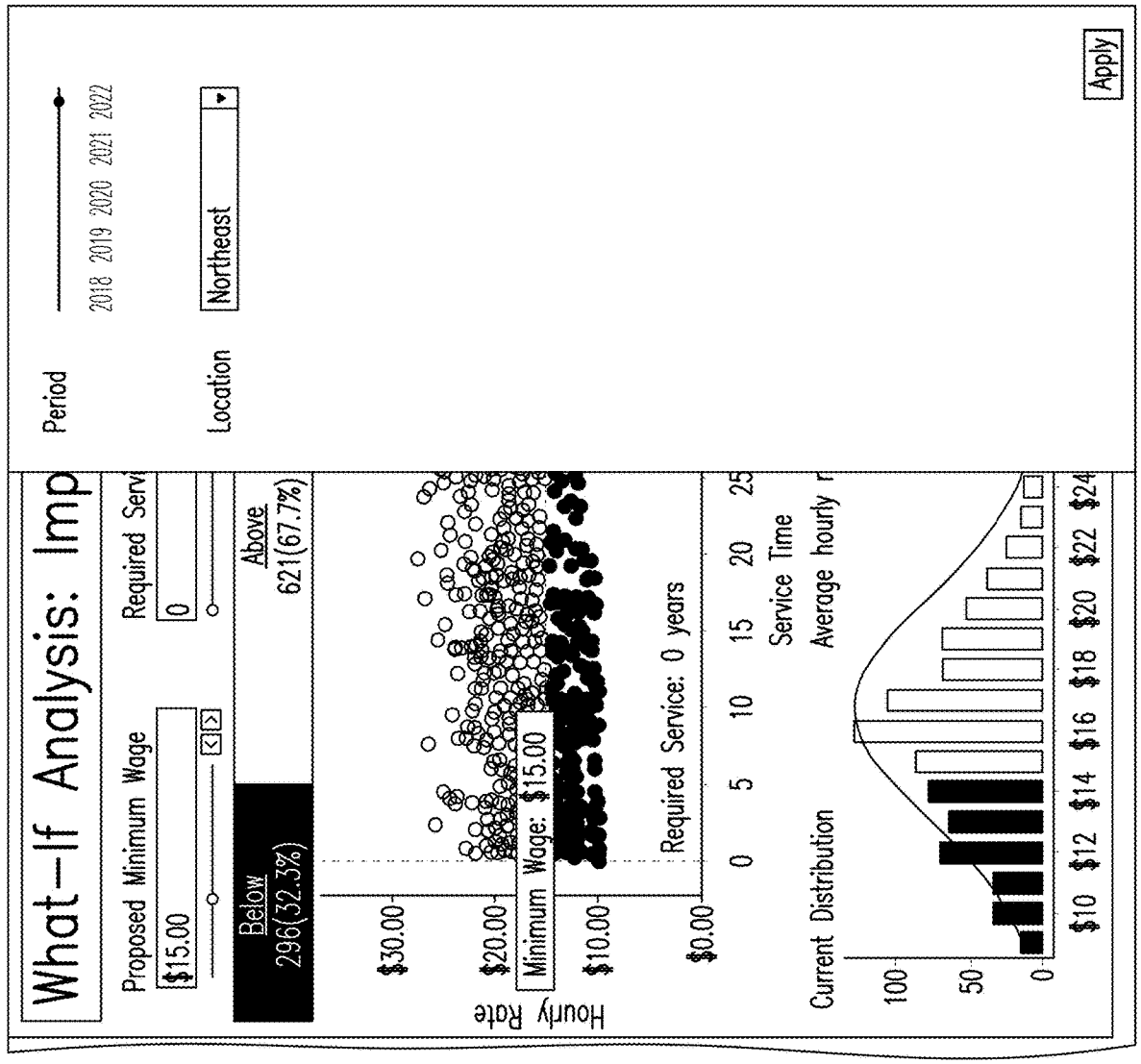

FIG. 16 shows a repeat of the previous steps for a new mapping definition of "Location." In this example, the parameter names from the different reports do match. Because the mapping definition was applied, the "Location" prompt control preview is displayed. FIG. 17 shows the third report tab, where the parameters can be drag and dropped into existing mapping definitions, or used to create new ones. Now that the mappings have been completed, the "Apply" button is pressed to implement. After the mappings are complete, the user is able to view the initial dashboard again. The three reports are rendered again and there is a filter icon provided that opens the Lens or mapping panel shown in FIG. 18, which contains the prompt controls. The user can select any of the added, mapped prompts to filter the displayed information in the GUI panels. The affected reports are automatically regenerated using the new prompt value(s) and redisplayed to the user.

Figures 1, 19:
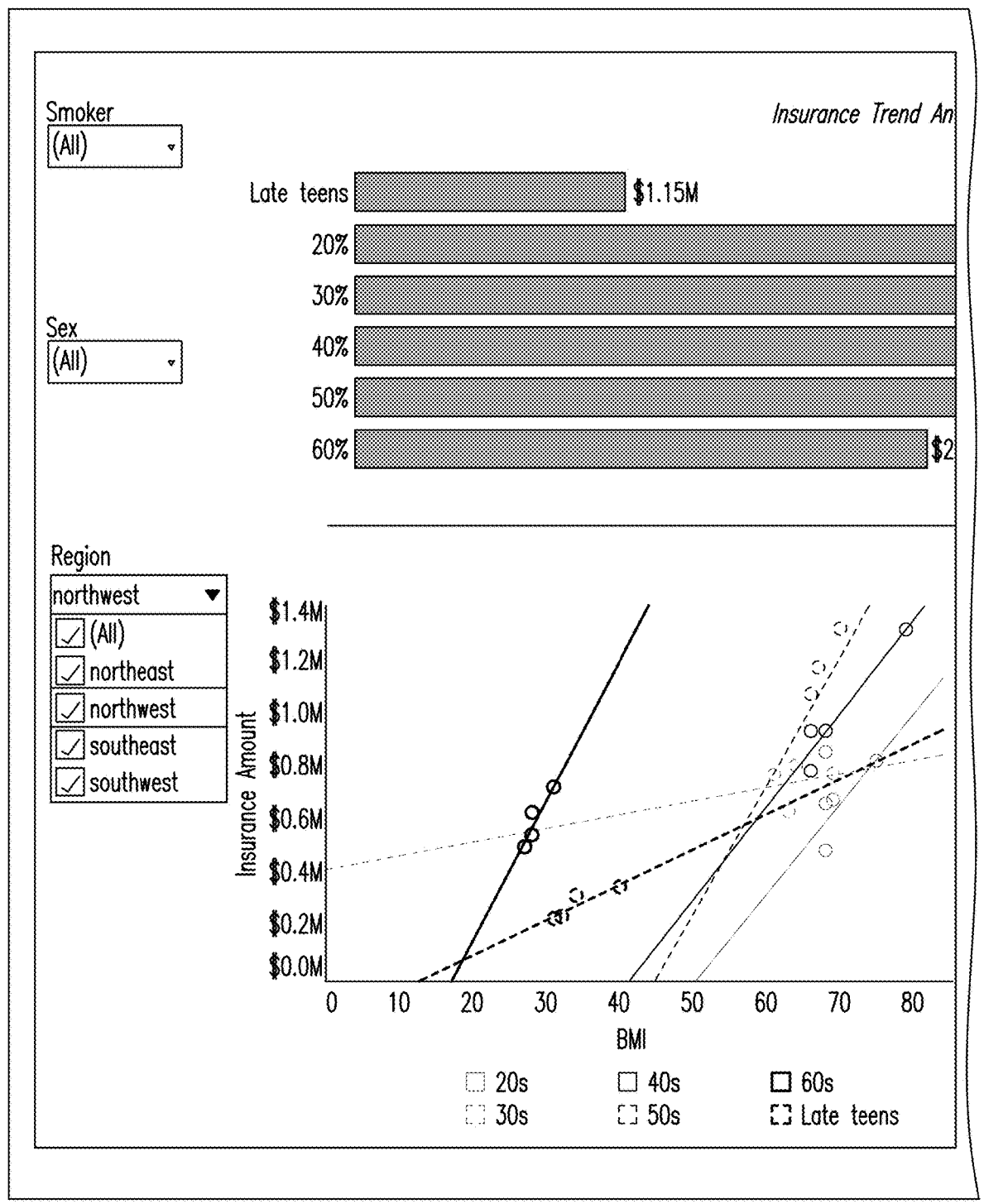
FIGS. 19 (19-1 and 19-2), 20 (20-1 and 20-2) and 21 (21-1 and 21-2) illustrate a filtering operation according to one embodiment of this invention.
Figures 2, 19:
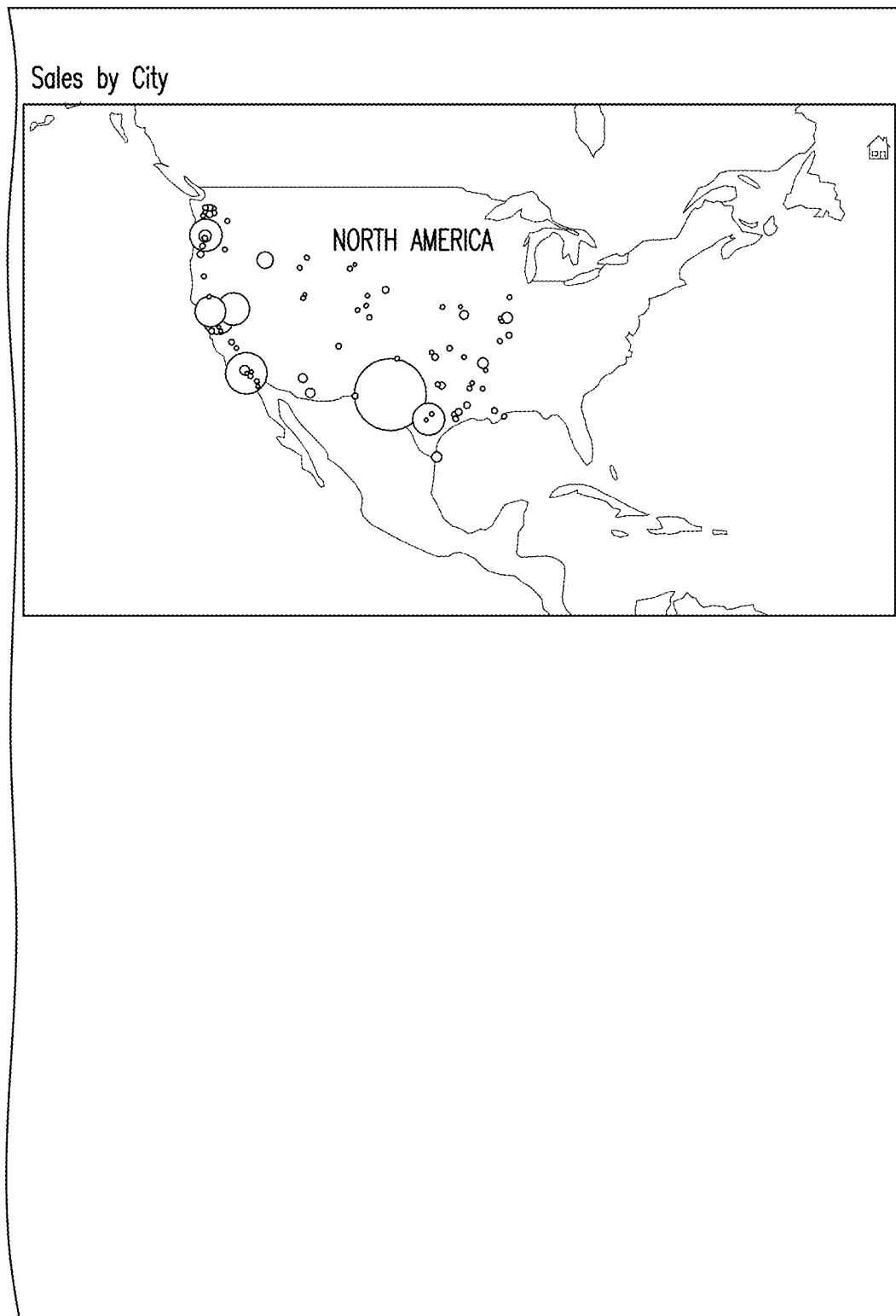
Figures 1, 20:
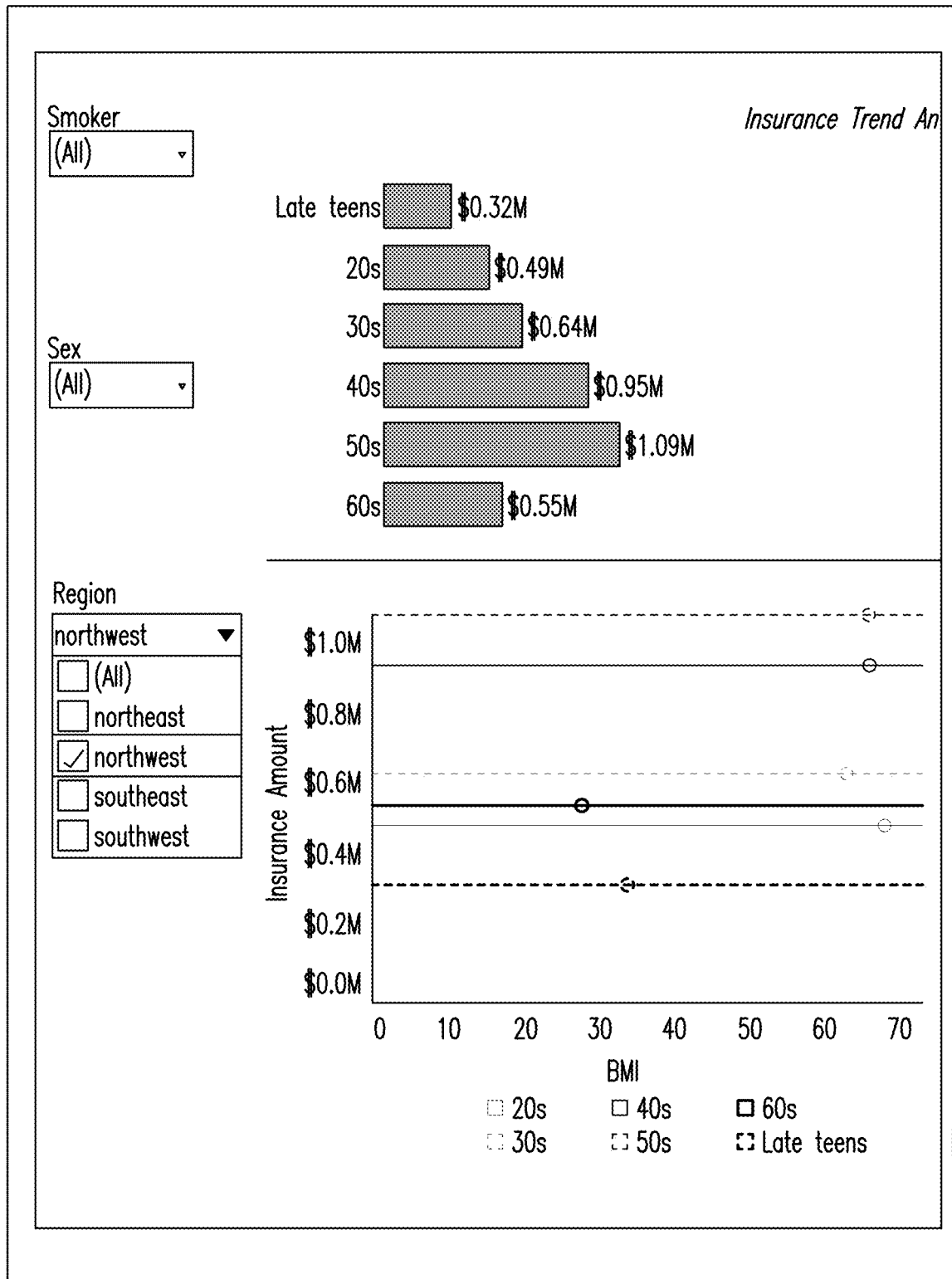
Figures 2, 20:
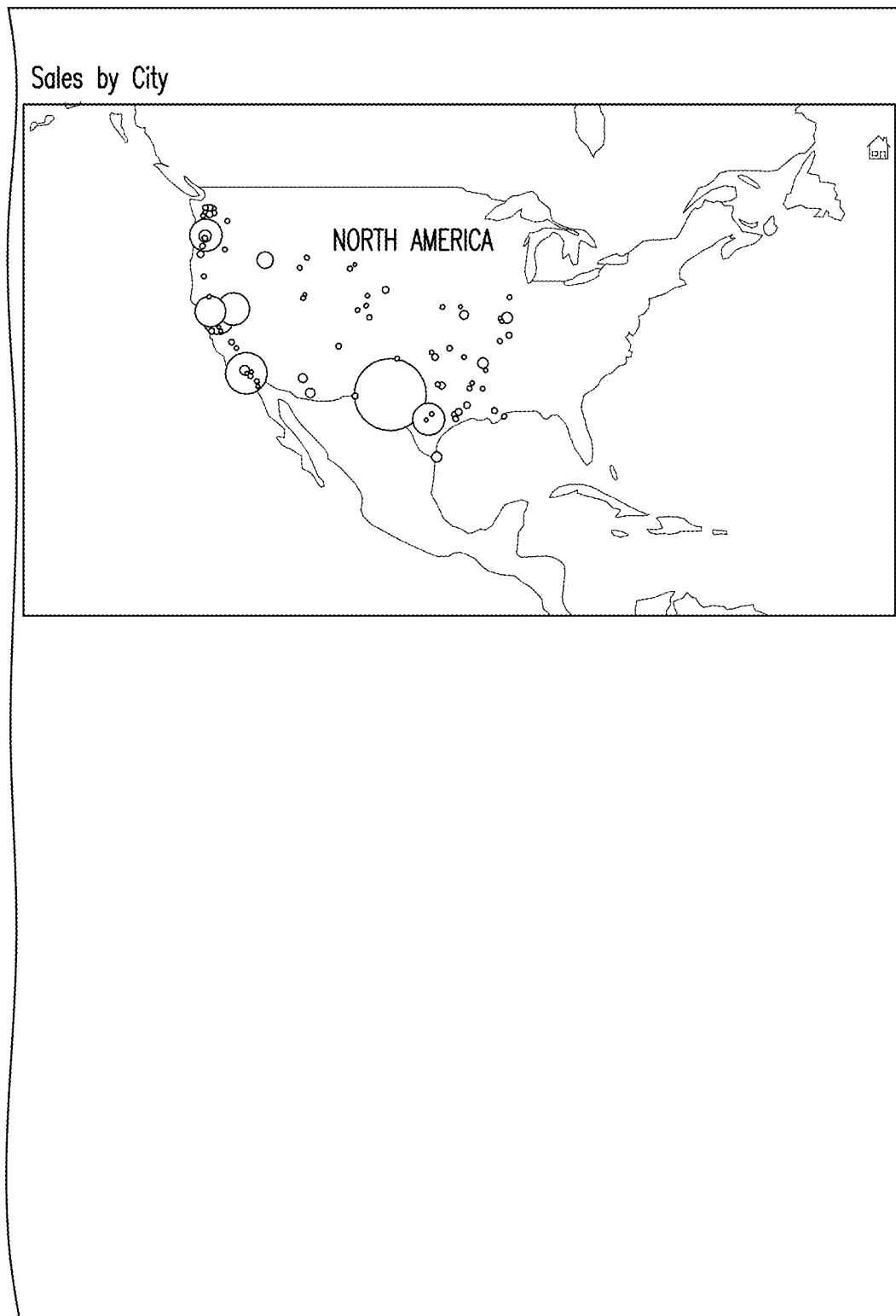
Figures 1, 21:
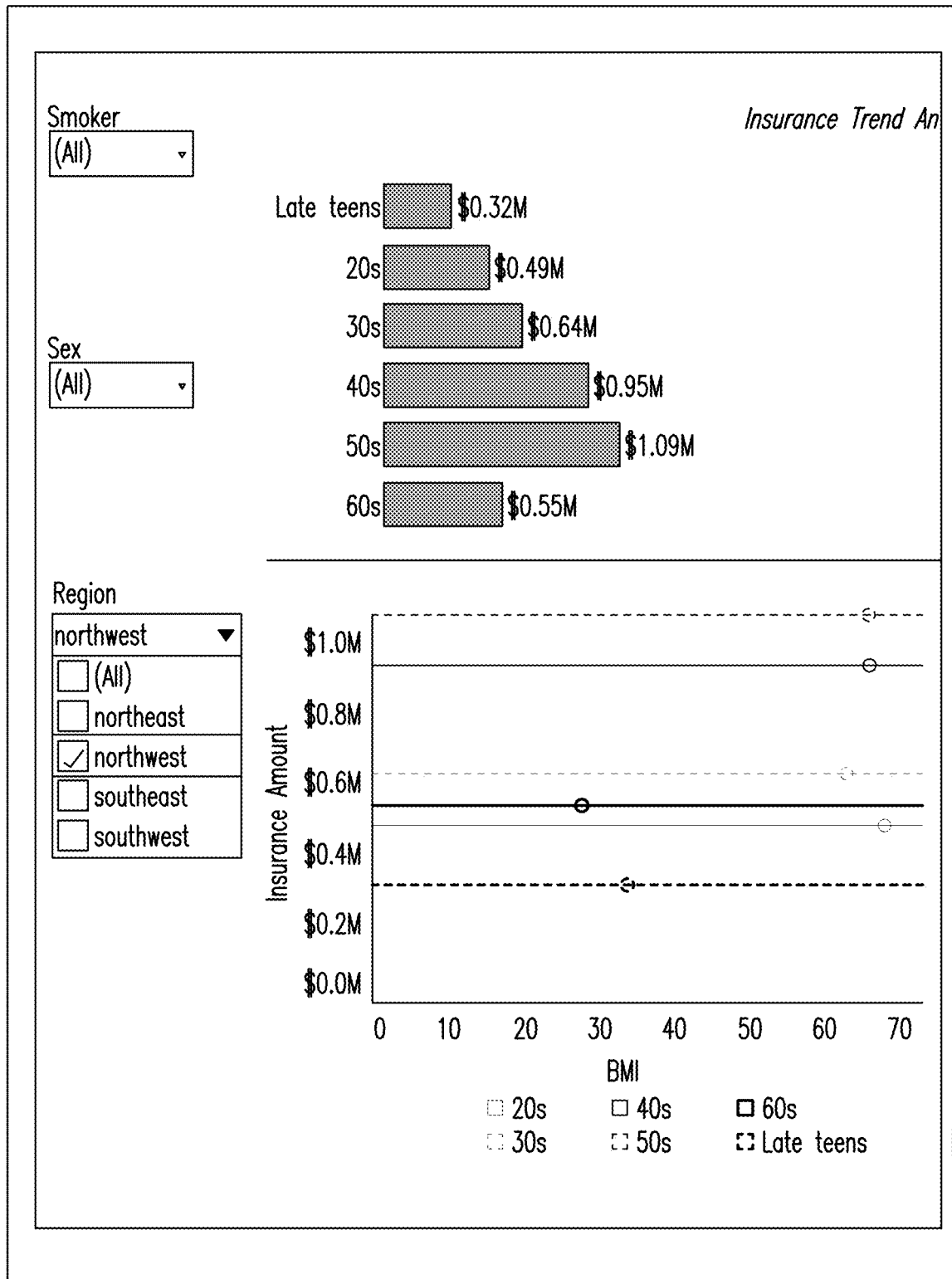
Figures 2, 21:
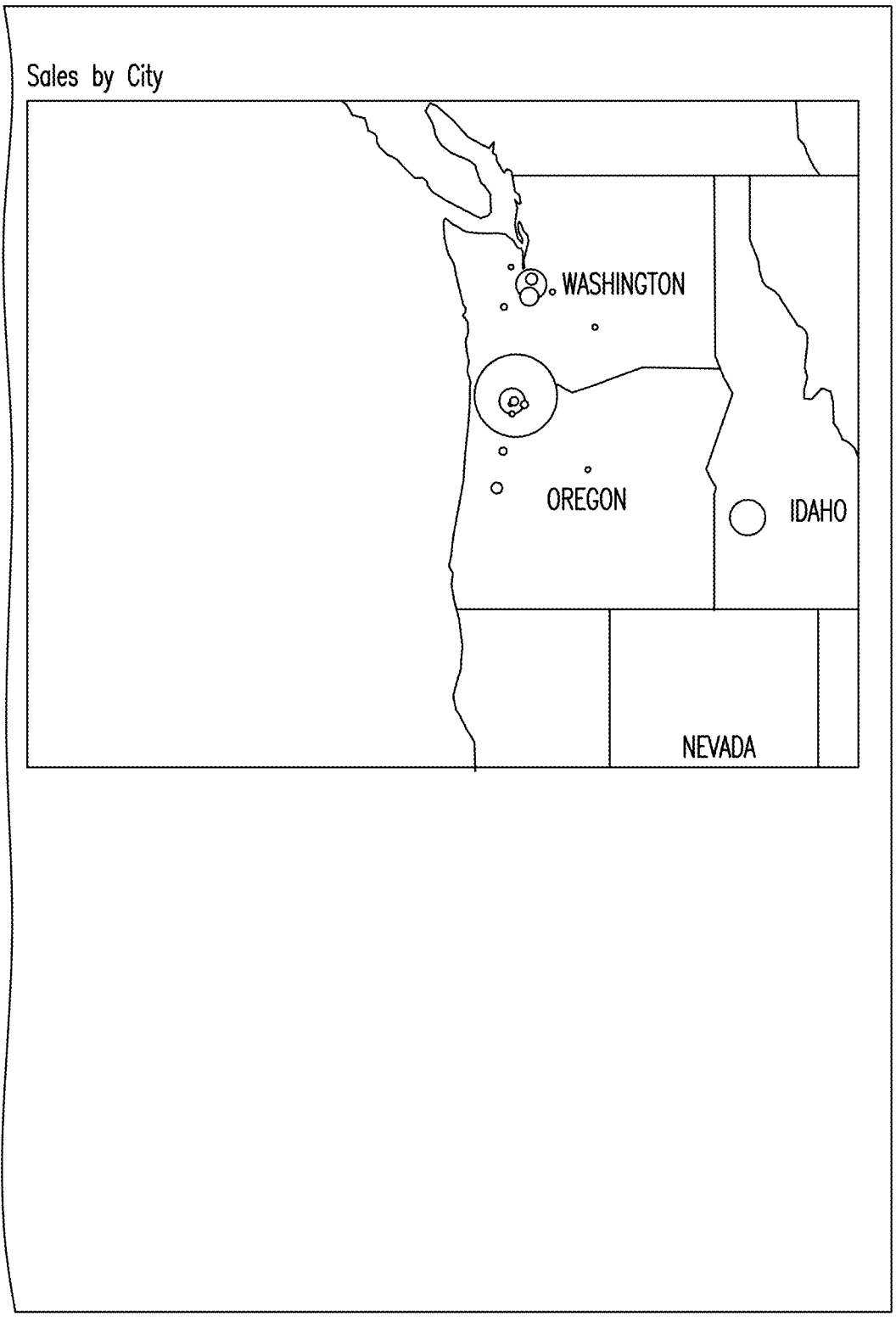

FIGS. 19-21 show a filtering embodiment according to another embodiment of this invention, including a dashboard with three BI&A report windows. The Tableau report (lower left) of FIG. 19 currently displays all available regions (4) of the U.S. Likewise the Qlik Sense report on the right also shows location parameters for all regions. In FIG. 20, the user selects a new value (the northwest) from a dropdown filter box in the Tableau report, which updates the Tableau report as shown. The Qlik Sense report is automatically re-executed using the selected 'northwest' as the value for the location parameter, and the new filtered results are displayed in FIG. 21. In other words, the filter of each report is linked/mapped to the other reports, such that a selection in one report automatically results in a corresponding filtering change in the other reports.

Thus the invention provides a system and method for combining data from across disparate business intelligence and analytics systems. In addition the system and method allow or provide for improved data usage, through improved data filtering.

The invention illustratively disclosed herein suitably may be practiced in the absence of any element, part, step, component, or ingredient which is not specifically disclosed herein.

While in the foregoing specification this invention has been described in relation to certain preferred embodiments thereof, and many details have been set forth for purpose of illustration, it will be apparent to those skilled in the art that the subject invention is susceptible to additional embodiments and that certain of the details described herein can be varied considerably without departing from the basic principles of the invention.

The invention claimed is:

1. A method for aligning results with a data processor system, from disparate analytics sources, the method comprising:
    receiving an analysis request from a user;
    automatically executing a first analytics platform of a first entity for a first data visualization;
    automatically executing a second analytics platform of a second entity for a second data visualization;
    displaying the first data visualization adjacent the second data visualization in real-time in a user interface, wherein the first data visualization and the second data visualization have nonmatching parameters for corresponding analysis parameters;
    automatically matching into a common parameter field a first nonmatching parameter of the first analytics platform and a corresponding second nonmatching parameter of the second analytics platform;
    filtering the first and second visualizations in the user interface according to a user input received through the user interface, wherein the filtering comprises:
        converting the user input into an application programming interface (API) connector for each of the first and second analytics platforms;
        connecting a first API connector to the first analytics platform using the first nonmatching parameter of the common parameter field and requesting a rerendering of the first data visualization according to the first nonmatching parameter;
        connecting a second API connector to the second analytics platform using the second nonmatching parameter of the common parameter field and requesting a rerendering of the second data visualization according to the second nonmatching parameter;
        automatically receiving a rerendered first data visualization from the first analytics platform and a rerendered second data visualization from the second analytics platform; and
    displaying the rerendered first data visualization adjacent the rerendered second data visualization in real-time in the user interface.

2. The method of claim 1, wherein the user input is a time input, a location input, an entity input, or combinations thereof.

3. The method of claim 1, wherein the first analytics platform is a first business intelligence visualization platform and the second analytics platform is a second business intelligence visualization platform.

4. The method of claim 1, wherein each of the first and second data visualizations comprises a report, a table a chart, a graph, or a list.

5. The method of claim 4, wherein each of the rerendered first and second data visualizations comprises the report, the table the chart, the graph, or the list, updated according to the user input.

6. The method of claim 1, wherein the user interface comprises a first report window for the first data visualization and the rerendered first data visualization, and a second report window for the second data visualization and the rerendered second data visualization.

7. The method of claim 6, wherein a user input in the first report window triggers the rerendering of both of the first and second data visualizations.

8. The method of claim 1, wherein a user selection through the user interface for the first data visualizations triggers the rerendering of both of the first and second data visualizations from the first and second analytics platforms.

* * * * *